(12) United States Patent
Kudoh et al.

(10) Patent No.: US 10,347,893 B2
(45) Date of Patent: Jul. 9, 2019

(54) SECONDARY BATTERY

(71) Applicants: KABUSHIKI KAISHA NIHON MICRONICS, Tokyo (JP); GUALA TECHNOLOGY CO., LTD., Hyogo-Ken (JP)

(72) Inventors: Takuo Kudoh, Tokyo (JP); Kiyoyasu Hiwada, Tokyo (JP); Tatsuo Inoue, Tokyo (JP); Akira Nakazawa, Hyogo-Ken (JP); Nobuaki Terakado, Hyogo-Ken (JP)

(73) Assignees: KABUSHIKI KAISHA NIHON MICRONICS, Tokyo (JP); GUALA TECHNOLOGY CO., LTD., Hyogo-Ken (JP)

(*) Notice: Subject to any disclaimer, the term of this patent is extended or adjusted under 35 U.S.C. 154(b) by 0 days.

(21) Appl. No.: 14/388,414

(22) PCT Filed: Apr. 5, 2013

(86) PCT No.: PCT/JP2013/060467
§ 371 (c)(1),
(2) Date: Sep. 26, 2014

(87) PCT Pub. No.: WO2013/154046
PCT Pub. Date: Oct. 17, 2013

(65) Prior Publication Data
US 2015/0188113 A1 Jul. 2, 2015

(30) Foreign Application Priority Data
Apr. 9, 2012 (WO) .................. PCT/JP2012/059706

(51) Int. Cl.
*H01M 2/00* (2006.01)
*H01M 2/20* (2006.01)
(Continued)

(52) U.S. Cl.
CPC ............ *H01M 2/204* (2013.01); *H01G 11/12* (2013.01); *H01G 11/76* (2013.01); *H01M 2/266* (2013.01);
(Continued)

(58) Field of Classification Search
CPC .......... H01M 10/052; H01M 10/0585; H01M 2/204; H01M 2/26; H01G 11/56
See application file for complete search history.

(56) References Cited

U.S. PATENT DOCUMENTS

2009/0029260 A1   1/2009   Hagiwara et al.
2009/0097189 A1   4/2009   Tasaki et al.
(Continued)

FOREIGN PATENT DOCUMENTS

CA   2728760 A1   3/2011
CN   1497760 A    5/2004
(Continued)

OTHER PUBLICATIONS

Machine translation of JP 2006185662, obtained Jul. 29, 2016.*
(Continued)

*Primary Examiner* — Nicholas P D'Aniello
(74) *Attorney, Agent, or Firm* — Bacon & Thomas, PLLC

(57) ABSTRACT

Provided is a secondary battery which is small in size and in which current capacity per unit volume can be increased. The present invention provides a secondary battery including two cell units each including a charging layer between a first electrode layer and a second electrode layer, the two cell units being parallel-connected by juxtaposing and connecting a first electrode layer of one cell unit and a first electrode layer of the other cell unit or a second electrode layer of the one cell unit and a second electrode layer of the other cell unit, and by wire-connecting the second electrode layer of the one cell unit and the second electrode layer of
(Continued)

the other cell unit or the first electrode layer of the one cell unit and the first electrode layer of the other cell unit.

5 Claims, 24 Drawing Sheets

(51) Int. Cl.
    *H01G 11/12*     (2013.01)
    *H01G 11/76*     (2013.01)
    *H01M 2/26*     (2006.01)
    *H01M 10/04*     (2006.01)
    *H01M 10/0585*     (2010.01)

(52) U.S. Cl.
    CPC .... *H01M 10/0413* (2013.01); *H01M 10/0585* (2013.01); *H01M 2220/30* (2013.01); *Y02E 60/13* (2013.01)

(56) References Cited

U.S. PATENT DOCUMENTS

| | | | |
|---|---|---|---|
| 2010/0067089 A1 | 3/2010 | Nakazawa | |
| 2011/0300667 A1* | 12/2011 | Nakazawa | G02F 1/015 438/104 |
| 2013/0149592 A1* | 6/2013 | Hayashi | H01M 4/66 429/160 |

FOREIGN PATENT DOCUMENTS

| | | |
|---|---|---|
| CN | 1612401 A | 5/2005 |
| CN | 101535885 A | 9/2009 |
| CN | 101997124 A | 3/2011 |
| EP | 2843746 A1 | 3/2015 |
| JP | 2003-257472 | 9/2003 |
| JP | 2003-257472 A | 9/2003 |
| JP | 2006-066083 | 3/2006 |
| JP | 2006-185662 | 7/2006 |
| JP | 2006-185662 A | 7/2006 |
| JP | 2007-012584 | 1/2007 |
| JP | 2009-140707 | 6/2009 |
| TW | 465137 | 11/2001 |
| WO | WO2012/020700 A1 | 2/2012 |
| WO | WO2012-020700 A1 | 2/2012 |
| WO | WO/2012/046325 A1 | 4/2012 |

OTHER PUBLICATIONS

Supplementary Extended European Search Report issued in corresponding European Patent Application No. 13774976.8 dated Jun. 25, 2015.
Literature: Battery Handbook, edited by The Committee of Battery Technology in The Electrochemical Society of Japan: "Nickel-metal hydride battery" Chapter VI, Part VI; pp. 319-320.
Official Communication issued in corresponding European Patent Appln. No. 13774976.8 dated Feb. 12, 2019.
Third & Fourth Pages of First Office Action Issued in Japanese Patent Application No. 2014-510148 dated Dec. 6, 2016.
First Page of Second Office Action Issued in Chinese Patent Application No. 101535885A dated Sep. 13, 2016.

* cited by examiner

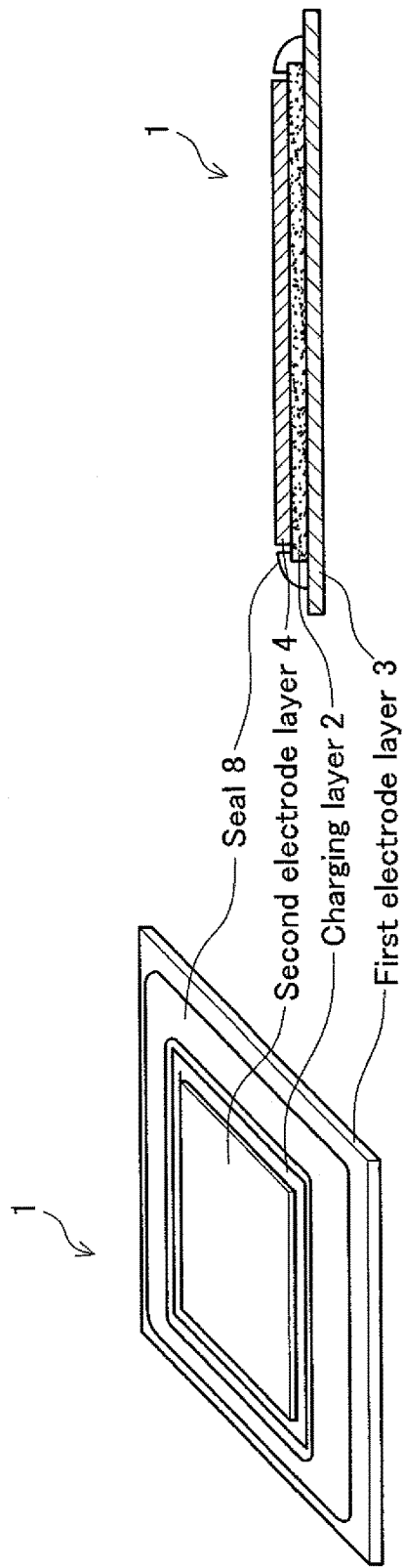

40B

SECONDARY BATTERY

TECHNICAL FIELD

The present invention relates to a secondary battery, and for example, relates to a solid-state secondary battery.

BACKGROUND ART

Recently, there is a need for small and high-capacity batteries. For actualizing a high-capacity battery, a multilayer structure is adopted for a battery. FIG. 2 illustrates an example of a multilayer structure of a conventional battery.

FIG. 2(A) illustrates a conventional cylinder-type battery structure in which electrode plates are arranged in a roll structure. In the battery in FIG. 2(A), a positive electrode plate and a negative electrode plate are arranged to be mutually faced to each other and a battery case is sealed after the positive electrode plate and the negative electrode plate with a separator interposed therebetween are wound and stored into the battery case.

FIGS. 2(B) and 2(C) illustrate examples of a battery structure of a conventional rectangular type. In the battery in FIG. 2(B), a battery case is sealed after a positive electrode plate and a negative electrode plate which are mutually faced with a separator interposed therebetween are bent into a rectangular shape or wound and pressed to be flattened and stored into the battery case. In the battery in FIG. 2(C), positive electrode plates and negative electrode plates are alternately inserted to valley grooves of a zigzag-folded separator continuous body and flattened by being pressed in a zigzag direction (see Patent Document 1).

FIG. 2(D) illustrates a structure of a multilayer ceramic capacitor not being a structure of a battery. The multilayer ceramic capacitor illustrated in FIG. 2(D) has a structure that dielectric ceramic and an internal electrode are alternately layered in a comb-shaped manner.

In addition to alkaline storage batteries such as nickel-hydrogen secondary batteries, the battery structures in FIGS. 2(A) to 2(C) have been applied to lithium ion secondary batteries as well.

Further, recently, there have been known solid-state secondary cells structured with solid thin films. FIG. 3(A) is a perspective view illustrating a structure of a solid-state secondary cell and FIG. 3(B) is a sectional view illustrating a section of the solid-state secondary battery. The secondary cell 1 in FIGS. 3(A) and 3(B) includes a solid charging layer 2 between a first electrode layer 3 and a second electrode layer 4 and is expected to actualize a downsized secondary battery.

CITED DOCUMENT

Patent Document

Patent Document 1: Japanese Patent Application Laid-Open No. 2009-140707

Non-Patent Document

Non-Patent Document 1: Committee of Battery Technology in Electrochemical Society (Feb. 10, 2010): Nickel-metal hydride battery: Battery handbook (Chapter VI, Part VI; pp. 319-320). Ohmsha, Ltd.

SUMMARY OF THE INVENTION

To increase a current capacity, it is required to adopt a structure that a plurality of secondary cells are layered in parallel connection having a single secondary cell as one unit. For layering in parallel connection, it is required to arrange an insulation layer for insulating a positive electrode terminal of a secondary cell and a negative electrode terminal of another secondary cell adjacent thereto, causing a large problem for downsizing.

The above problem will be described with reference to drawings. FIG. 4 illustrates a multilayer structure that the solid-state secondary cells in FIG. 3(B) are layered in serial connection. FIG. 6 illustrates a multilayer structure that solid-state secondary cells each having a single-layer structure illustrated in FIG. 5 are layered in parallel connection. FIGS. 4 and 6 illustrate six-layered multilayer structures, respectively.

In FIG. 4, the secondary cell having a single-layer structure is assumed to have voltage $V_0$ (V) and single-layer current capacity $I_0$ (=I×t (Ah)). In this case, since the number of layers (N) of the secondary battery having the multilayer structure in serial connection is six, voltage $V_1$ becomes to $6V_0$ (=N×$V_0$) and current capacity $I_1$ remains at $I_0$.

Meanwhile, the secondary cell is assumed to have the voltage $V_0$ and the current capacity $I_0$ as well in FIG. 6. Here, since the number of layers (N) of the secondary battery having the multilayer structure in parallel connection is six, voltage $V_1$ remains at $V_0$ and current capacity $I_1$ becomes to $6I_0$ (=N×$I_0$). Thus, the current capacity of the secondary battery having the multilayer structure in parallel connection becomes larger than that of the secondary battery having the multilayer structure in serial connection.

Here, as illustrated in FIGS. 5 and 6, it is required for the secondary battery having the multilayer structure in parallel connection to include an insulation layer 9 between a negative electrode terminal 7 and a positive electrode terminal 6 for preventing short circuits. Accordingly, since volume is increased by the amount of the insulation layers 9, volume of the secondary battery having the multilayer structure in parallel connection becomes larger than that of the secondary battery having the multilayer structure in serial connection.

In general, volume efficiency Vth of a battery is obtained as "Vth=Ve/Va" as Ve denoting effective volume of the battery and Va denoting whole volume of the battery. Accordingly, to improve efficiency of current capacity of a battery, it is required to reduce whole volume of the battery while single-layer cells are parallel-connected.

Here, the number of layers may be increased for further increasing capacity. The number of insulation layers increases with increase of the number of layers. Accordingly, a secondary battery whose whole volume is small has been desired for being downsized and increasing current capacity per unit volume.

In view of the abovementioned problems, there has been strongly desired for a secondary battery whose current capacity per unit volume can be increased.

To solve such problems, a first invention provides a secondary battery including two cell units each including a charging layer between a first electrode layer and a second electrode layer, the two cell units being parallel-connected by juxtaposing and connecting a first electrode layer of one cell unit and a first electrode layer of the other cell unit or a second electrode layer of the one cell unit and a second electrode layer of the other cell unit, and by wire-connecting the second electrode layer of the one cell unit and the second electrode layer of the other cell unit or the first electrode layer of the one cell unit and the first electrode layer of the other cell unit.

A second invention provides a secondary battery including one or a plurality of first cell groups each including a plurality of cell units which are serial-connected, each unit structured in the order of a first electrode layer, a charging layer, and a second electrode layer; and one or a plurality of second cell groups each including a plurality of cell units which are serial-connected, each unit structured in the order of a second electrode layer, a charging layer, and a first electrode layer. Here, each first cell group and each second cell group are parallel-connected by juxtaposing and connecting the lowermost first electrode layer of the first cell group and the uppermost first electrode layer of the second cell group or the uppermost second electrode layer of the first cell group and the lowermost second electrode layer of the second cell group, and by wire-connecting the uppermost second electrode layer of the first cell group and the lowermost second electrode layer of the second cell group or the lowermost first electrode layer of the first cell group and the uppermost first electrode layer of the second cell group.

A third invention provides a second battery including a plurality of ring-shaped cell units which are concentrically arranged, each cell unit being structured in the order of a first electrode layer, a charging layer, and a second electrode layer. Here, the plurality of cell units are parallel-connected by juxtaposing and connecting a first electrode layer or a second electrode layer of a cell unit at the inner side and a first electrode layer or a second electrode layer of a cell unit at the outer side.

According to the present invention, since a secondary battery having a multilayer structure can be formed without arranging a conventional insulation layer, current capacity per unit volume can be increased.

BRIEF DESCRIPTION OF THE DRAWINGS

FIG. 3 is an explanatory view illustrating a structure of a solid-state secondary battery.

EMBODIMENTS OF THE INVENTION (A) First Embodiment and Modified Embodiments

In the following, a first embodiment and modified embodiments of a secondary battery of the present invention will be described in detail with reference to the drawings.

In each embodiment described below, there is provided a secondary battery having a multilayer structure that a plurality of thin-film solid-state secondary cells (called cell units as well) are layered in parallel connection as described below.

The secondary cell being the cell unit having at least a charging layer, which stores electrons, between a first electrode layer and a second electrode layer can be widely used. For example, the secondary cell being the cell unit can adopt an all-solid lithium secondary cell having inorganic solid electrolyte between a positive electrode and a negative electrode, a solid-state secondary cell exemplified in FIG. 3, or the like. In the present embodiment, examples using the latter solid-state secondary cell are described.

In the following, a single-layer denotes a structural unit for structuring a secondary battery having a multilayer structure.

(A-1) Description of Secondary Cell

Figure 1:
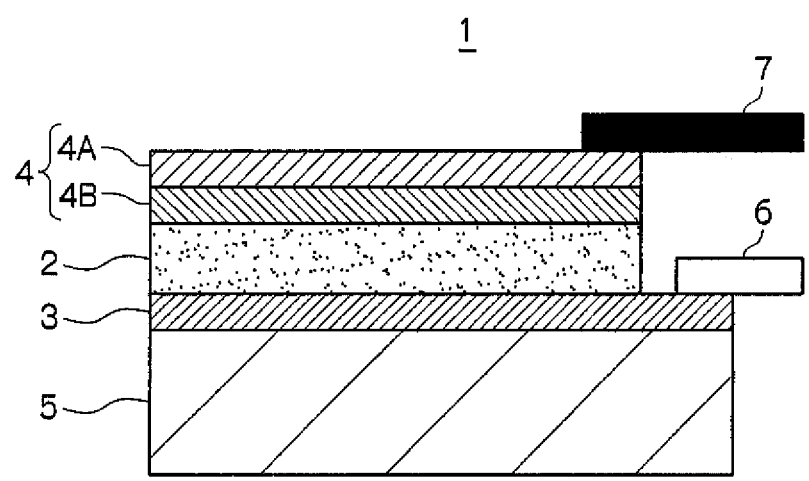
FIG. 1 is an explanatory view illustrating a structure of a secondary cell according to an embodiment.
Figure 2A:
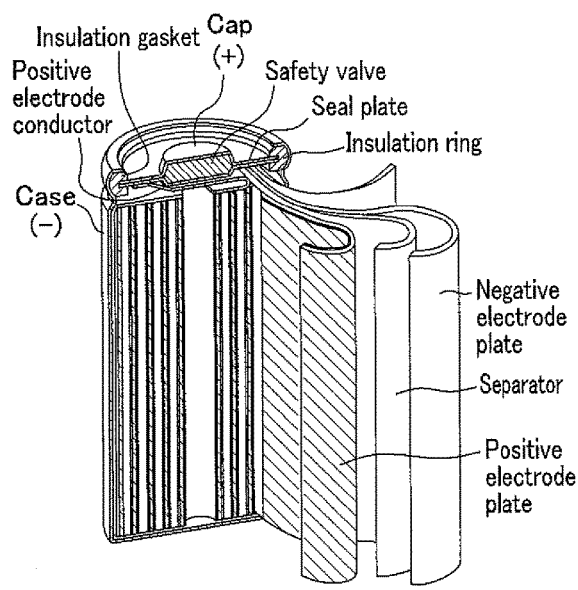
FIG. 2 is an explanatory view illustrating an example of a multilayer structure of a conventional battery.
Figure 2B:
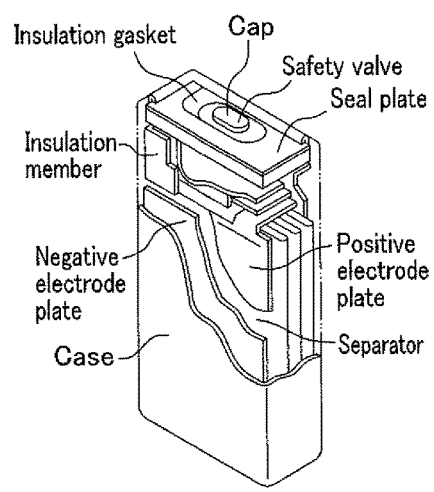
Figure 2C:
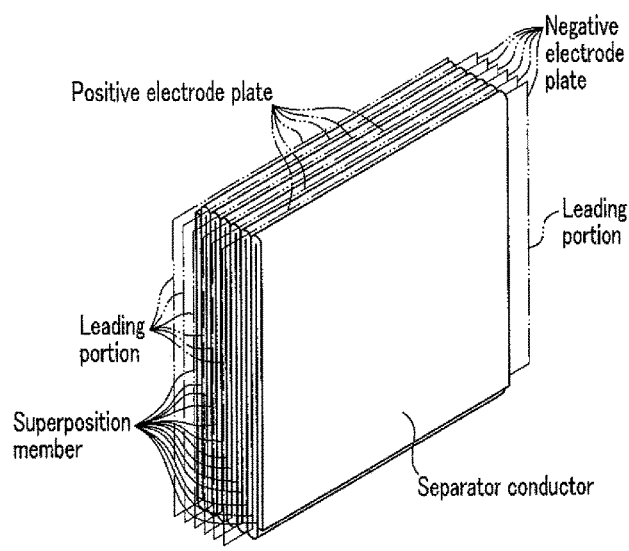
Figure 2D:
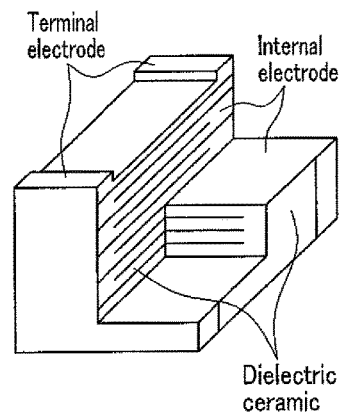
Figure 4:
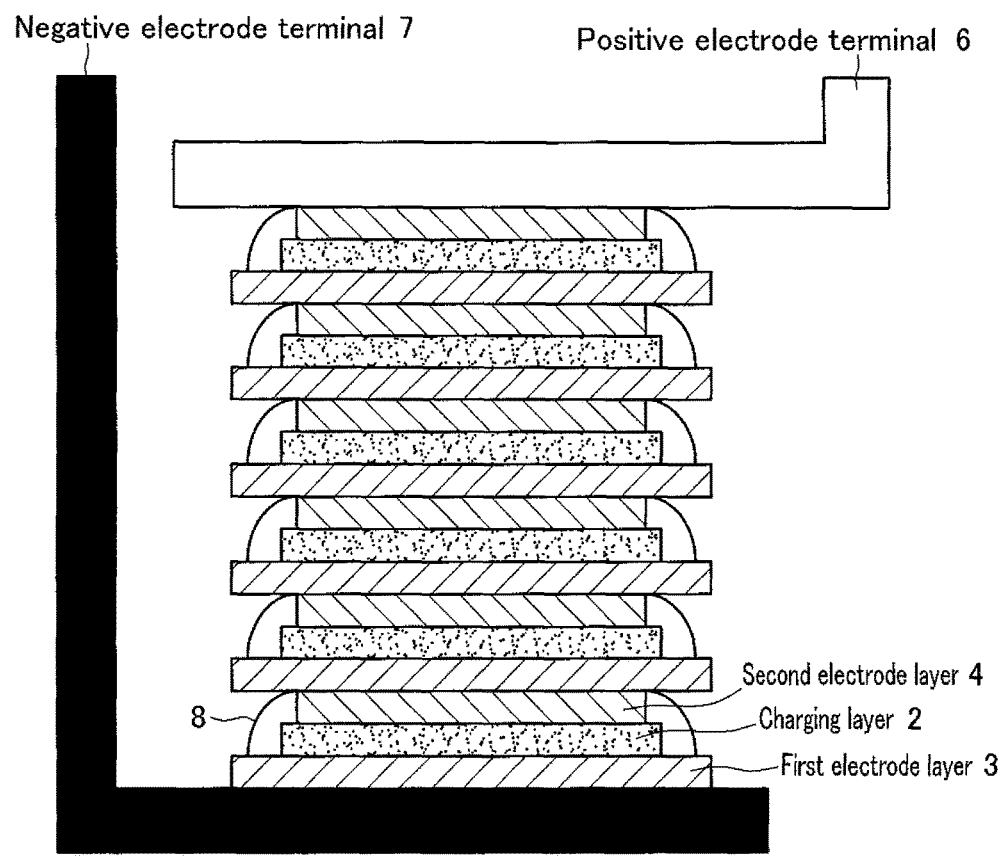
FIG. 4 is a sectional view of a multilayer structure in serial connection using the solid-state secondary battery in FIG. 3.
Figure 5:
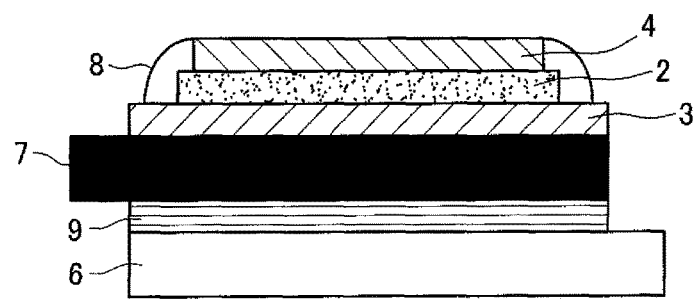
FIG. 5 is a sectional view illustrating a single-layer structure for forming the solid-state secondary battery having a multilayer structure in parallel connection.
Figure 6:
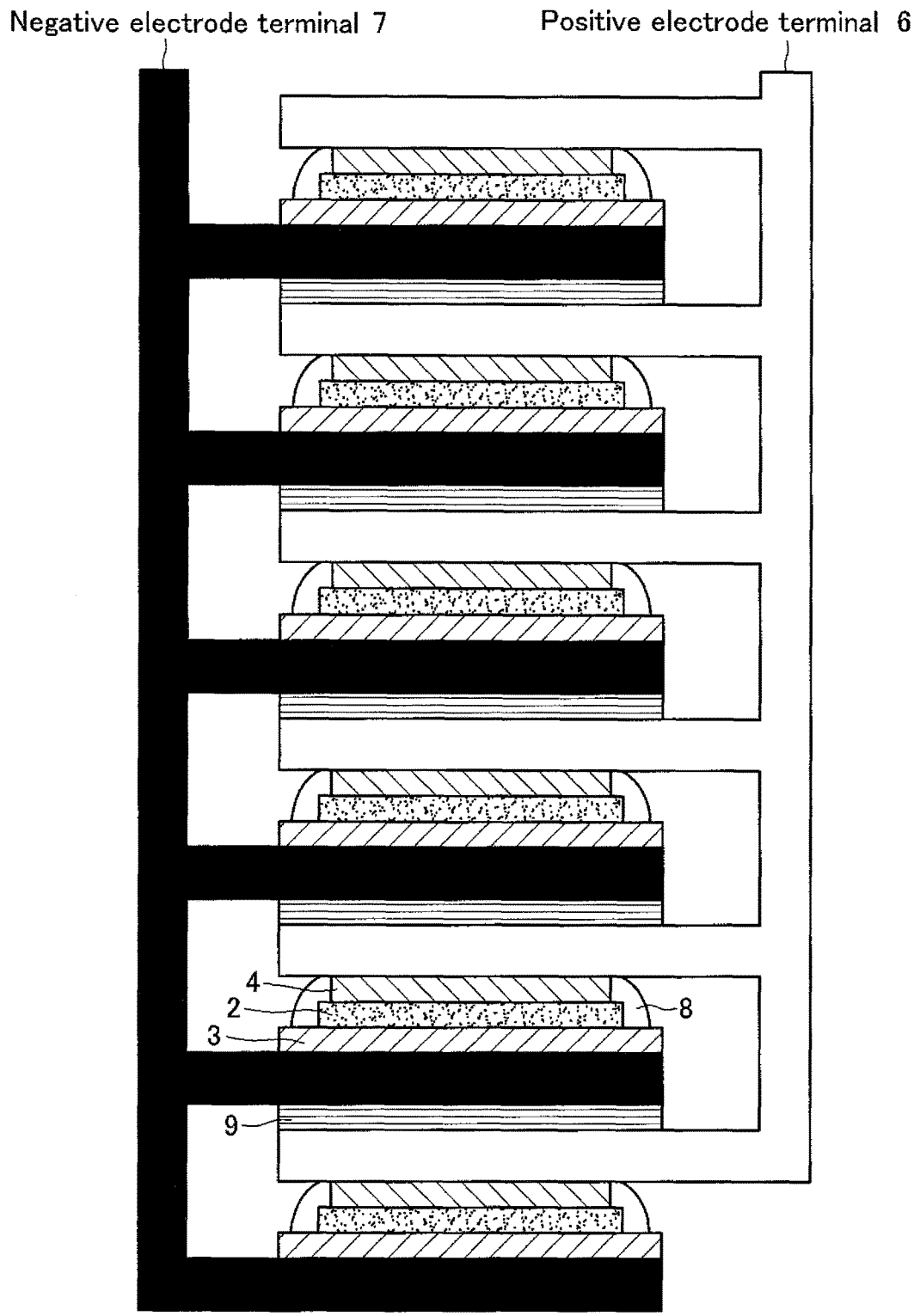
FIG. 6 is a sectional view illustrating a multilayer structure in parallel connection using the single-layers in FIG. 5.

FIG. 1 is an explanatory view illustrating a structure of a secondary cell being the cell unit. As illustrated in FIG. 1, a secondary cell 1 is a solid-state cell in which a charging layer 2 is sandwiched between a first electrode layer 3 and a second electrode layer 4 and the respective layers are thinned. Since the respective layers are thinned, the secondary cell 1 is formed into a sheet shape. In FIG. 1, the first electrode layer 3 is a layer for a negative electrode and the second electrode layer 4 is a layer for a positive electrode.

FIG. 1 illustrates an example in a state that the secondary cell 1 is attached onto a base material 5 and a negative electrode terminal 6 and a positive electrode terminal 7 are attached respectively to the first electrode layer 3 and the second electrode layer 4.

FIG. 1 illustrates a state that the secondary cell 1 is attached onto the base material 5. However, an operational principle of the secondary cell 1 is not contributed by the base material 5. That is, it is simply required for the secondary cell 1 that the charging layer 2 is sandwiched between the first electrode layer 3 and the second electrode layer 4 and the negative electrode terminal 6 and the positive electrode terminal 7 are attached respectively to the first electrode layer 3 and the second electrode layer 4.

The secondary cell 1 exemplified in FIG. 1 is a quantum cell capable of repeatedly performing charging and discharging by utilizing a photoexcited structural change. A quantum cell is based on an operational principal of forming a new energy level in a band gap and capturing an electron by utilizing a photoexcited structural change of a metal oxide.

The charging layer 2 is a layer to store electrons with a charging operation, to release the charged electrons with a discharging operation, and to keep the electrons (to perform storage of electricity) in a state without charging/discharging. The charging layer 2 is formed by applying a photoexcited structural change technology.

The photoexcited structural change is described, for example, in International Patent Application Laid-open No. WO/2008/053561 and is a phenomenon (technology) found out by Akira Nakazawa, who is an inventor of the above application as well as the present application. That is, Akira Nakazaw found out that, when effective excitation energy is applied to an insulation-coated translucent metal oxide which is a semiconductor having a band gap at a predetermined value or higher, a number of energy levels with no electron are generated in the band gap. The quantum cell is charged by capturing electrons in these energy levels and discharged by releasing the captured electrons.

In the quantum cell, the second electrode layer 4 includes an electrode main body layer 4A and a p-type metal oxide semiconductor layer 4B formed to be in contact with the charging layer 2. The p-type metal oxide semiconductor layer 4B is arranged so that electrons are prevented from being injected from the electrode main body layer 4A to the charging layer 2.

The first electrode layer 3 and the electrode main body layer 4A of the second electrode layer 4 are simply required to be formed as conductive layers.

The charging layer 2 is formed in a way where insulation-coated n-type metal oxide semiconductor particles adhere to the first electrode layer 3 in a thin film shape and is transformed to be capable of storing electrons with a photoexcited structural change caused at the n-type metal oxide semiconductor by ultraviolet irradiation.

A secondary battery described in the following is formed by using a plurality of cells, each functioning as a separate quantum cell illustrated in FIG. 1. In the following examples, the secondary cell is shaped rectangular. However, not limited to a rectangle, it is possible to have another shape, such as a circle, an ellipse, and a hexagon. In the quantum cell illustrated in FIG. 1, the first electrode layer 3 and the second electrode layer 4 may have a thickness approximately in a range between 10 nm and 1 μm and the charging layer 2 may have a thickness approximately in a range between 50 nm and 10 μm.

In a case that a quantum cell is adopted for the secondary battery described in the following, the quantum cell includes a charging layer formed of a perfect solid. Accordingly, being different from a case of a secondary cell having a charging layer formed of a liquid electrolyte, it is not required for a quantum cell to have a sealing structure for sealingly holding a liquid electrolyte. Further, not like all-solid lithium secondary cells for which study results have been reported recently, a granulated electrolyte is not used as well. Accordingly, in a case that a quantum cell is adopted as a secondary cell, the cell can be structured simply with a layer structure which is easily prepared. Consequently, compared to a conventional secondary cell, it is advantageous to obtain a relatively flexible shape by processing.

(A-2) Multilayer Structure in Parallel Connection

Next, a multilayer structure in parallel connection using a plurality of secondary cells 1 each being the cell unit in FIG. 1 will be described with reference to drawings.

Figure 7:
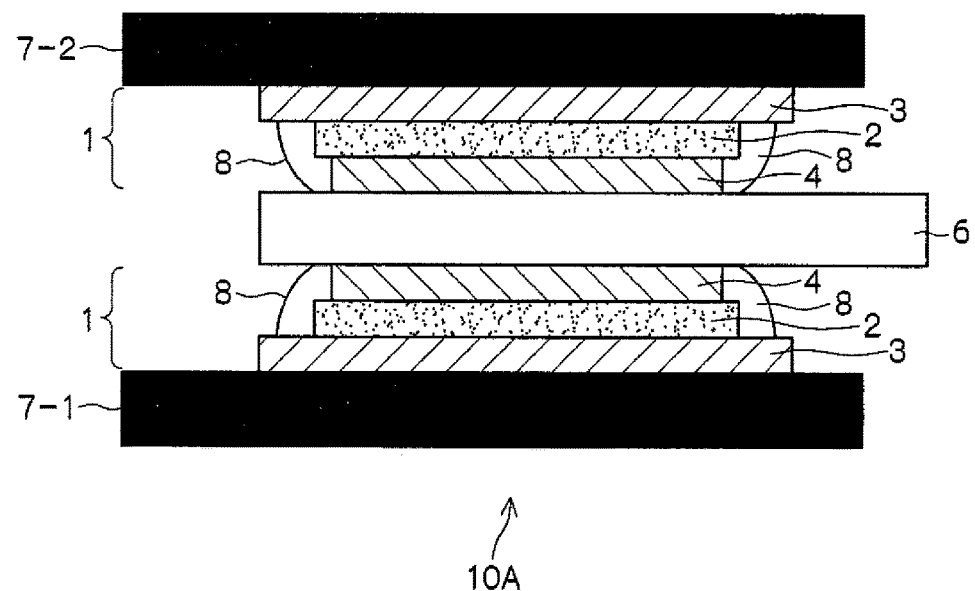
FIG. 7 is a sectional view illustrating a single-layer structure for forming an alternate multilayer structure in parallel connection with second electrode layers mutually faced.

(A-2-1) Alternate Multilayer Structure in Parallel Connection with Second Electrode Layers 4 Mutually Faced FIG. 7 is a sectional view illustrating a layered structure in parallel connection with second electrode layers 4 of two secondary cells 1 juxtaposed and connected as being mutually faced.

Figure 8:
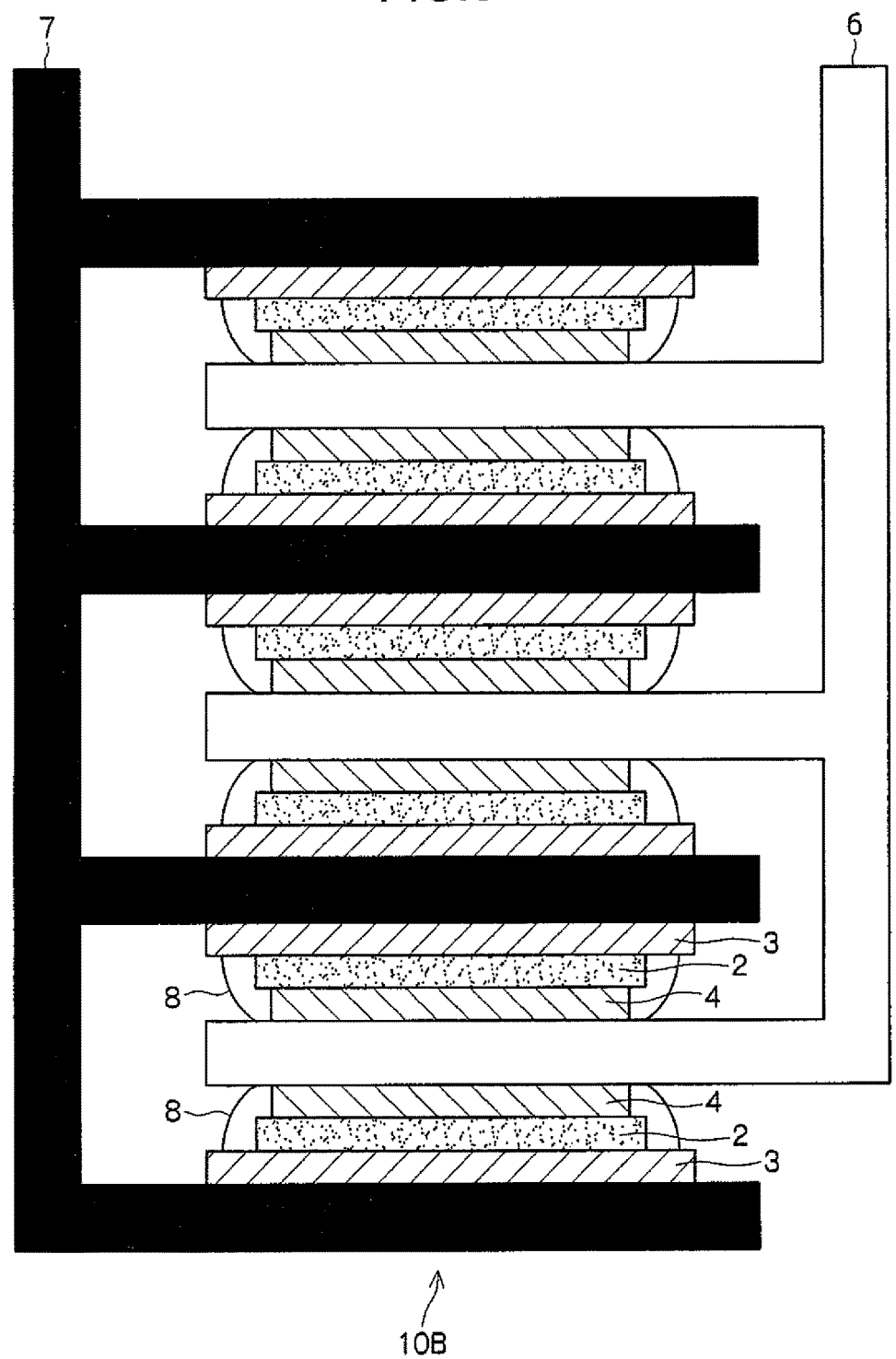
FIG. 8 is a sectional view illustrating a multilayer structure in parallel connection using the single-layers in FIG. 7.

FIG. 8 is a sectional view illustrating an alternate multilayer structure in parallel connection using a plurality of single-layers, the single-layer having the structure illustrated in FIG. 7.

A single-layer 10A illustrated in FIG. 7 has the layered structure in which two secondary cells 1 are parallel-connected. As illustrated in FIG. 7, one secondary cell 1 out of the two secondary cells 1 is sandwiched between a negative electrode terminal 7-1 and a positive electrode terminal 6 and the other secondary cell 1 is sandwiched between the positive electrode terminal 6 and a negative electrode terminal 7-2.

Here, the second electrode layer 4 of one secondary cell 1 and the secondary electrode layer 4 of the other secondary cell 1 are connected to the positive electrode terminal 6 as being mutually faced. That is, in FIG. 7, the one secondary cell 1 is arranged with the first electrode layer 3, the charging layer 2, and the second electrode layer 4 placed in the order thereof in a direction from the negative electrode terminal 7-1 toward the positive electrode terminal 6. Meanwhile, the other secondary cell 1 is arranged with the second electrode layer 4, the charging layer 2, and the first electrode layer 3 placed in the order thereof in a direction from the positive electrode terminal 6 toward the negative electrode terminal 7-2.

Further, the first electrode layer 3 of the one secondary cell 1 is wire-connected to the negative electrode terminal 7-1 and the first electrode layer 3 of the other secondary cell 1 is wire-connected to the negative electrode terminal 7-2.

A multilayer 10B in parallel connection illustrated in FIG. 8 has a structure that three single-layers 10A illustrated in FIG. 7 are layered.

In a case that a single-layer 10A is layered on another single-layer 10A, the negative electrode terminal 7-1 of the single-layer 10A is layered on the negative electrode terminal 7-2 of the other single-layer 10A. Such a structure may be adopted. However, in the present embodiment, as illustrated in FIG. 8, the two negative electrode terminals 7-1, 7-2 between the layered single-layers 10A are formed as a single negative electrode terminal 7 for further reducing the volume thereof.

FIG. 8 exemplifies a case that the negative electrode terminal 7 is connected to the entire face of the first electrode layer 3. However, since it is only required to be capable of transferring electrons, the negative electrode terminal 7 may be connected to at least a part of the first electrode layer 3. For a similar reason, the positive electrode terminal 6 is simply required to be connected to at least a part of the second electrode layer 4.

Here, the secondary cell 1 is assumed to have voltage $V_0$ and current capacity $I_0$. In this case, voltage $V_{10B}$ of the multilayer 10B in FIG. 8 is $V_0$. Then, since the number of layers N is six, current capacity $I_{10B}$ of the multilayer 10B in FIG. 8 becomes to $6I_0$ ($=N \times I_0$). Thus, parallel connection increases the current capacity.

Owing to adopting the structure illustrated in FIGS. 7 and 8, it is not required to arrange an insulation member between a negative electrode terminal and a positive electrode terminal in the parallel connection. Accordingly, compared to the related art, battery volume is reduced by the amount thereof and current capacity per unit volume is increased.

Here, FIG. 8 exemplifies a case that three single-layers 10A are layered. However, it is also possible to layer two, four or more of single-layers 10A.

Figure 9:
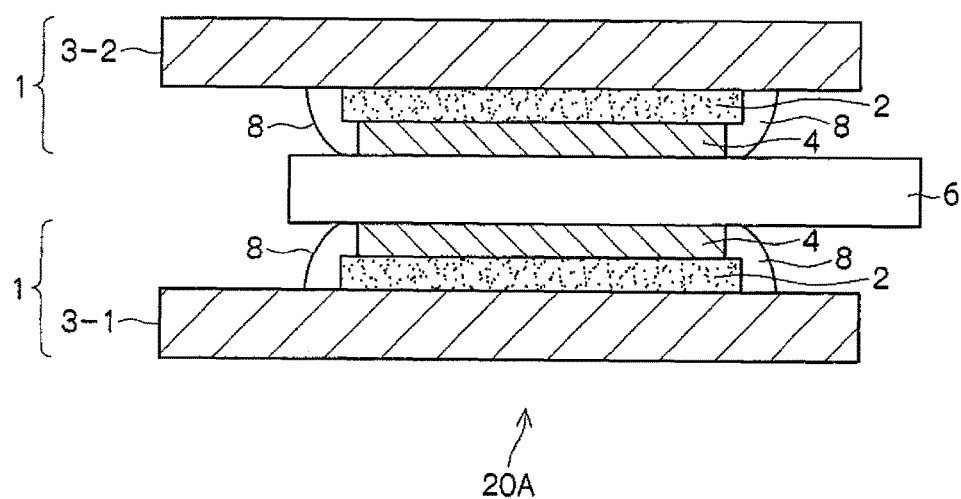
FIG. 9 is a sectional view illustrating a single-layer structure for forming an alternate multilayer structure in parallel connection with second electrode layers mutually faced and a negative electrode terminal also serving as a first electrode layer.

(A-2-2) Alternate Multilayer Structure in Parallel Connection with Second Electrode Layers 4 Mutually Faced and First Electrode Layer 3 Also Serving as Negative Electrode Terminal FIG. 9 is a sectional view illustrating a layered structure in parallel connection with the second electrode layers 4 of two secondary cells 1 juxtaposed and connected as being mutually faced.

Figure 10:
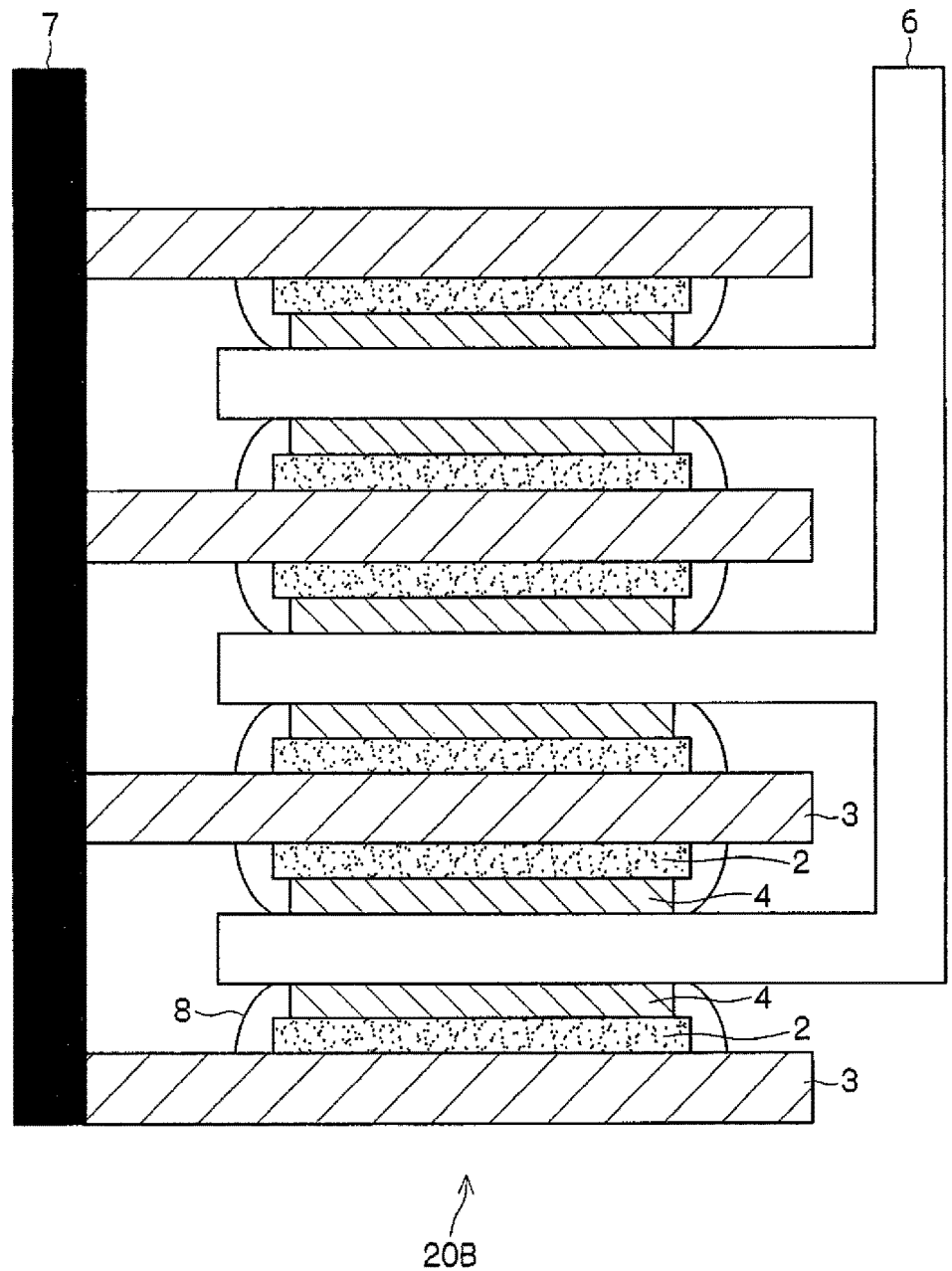
FIG. 10 is a sectional view illustrating a multilayer structure in parallel connection using a plurality of the single-layers in FIG. 9.

FIG. 10 is a sectional view illustrating an alternate multilayer structure in parallel connection using a plurality of single-layers, the single-layer having the structure illustrated in FIG. 9.

In a single-layer 20A illustrated in FIG. 9, the first electrode layers 3 also serve as leading negative electrode terminals 7-1, 7-2 illustrated in FIG. 7. That is, as illustrated in FIG. 9, two secondary cells 1 are arranged to sandwich the positive electrode terminal 6 with the second electrode layers 4 mutually faced. The first electrode layer 3-1 of one secondary cell 1 corresponds to the leading negative electrode terminal 7-1 in FIG. 7 and the first electrode layer 3-2 of the other secondary cell 1 corresponds to the negative electrode terminal 7-2 in FIG. 7.

Accordingly, compared to the single-layer 10A in FIG. 7, the single-layer 20A in FIG. 9 is reduced in volume by the amount of the leading negative electrode terminals 7-1, 7-2.

A multilayer 20B in parallel connection illustrated in FIG. 10 has a structure that three single-layers 20A are layered.

In a case that a single-layer 20A is layered on another single-layer 20A, the first electrode layer 3-1 of the single-layer 20A is layered on the first electrode layer 3-2 of the other single-layer 20A. Such a structure may be adopted. However, in the present embodiment, as illustrated in FIG. 10, the two first electrode layers 3-1, 3-2 between the layered single-layers 20A are formed as a single first electrode layer 3 for further reducing the volume thereof.

In FIG. 10, the first electrode layer 3 corresponds to the leading negative electrode terminal 7. Therefore, in the multilayer 20B in FIG. 10, the first electrode layers 3 are extended in one direction so as to be wire-connected to the negative electrode terminal 7.

Here, the secondary cell 1 is assumed to have voltage $V_0$ and current capacity $I_0$. In this case, voltage $V_{20B}$ of the multilayer 20B in FIG. 10 is $V_0$. Then, since the number of layers N is six, current capacity $I_{20B}$ of the multilayer 20B in FIG. 10 becomes to $6I_0$ ($=N \times I_0$). Thus, parallel connection increases the current capacity.

Similarly to the case of adopting the structure illustrated in FIGS. 7 and 8, owing to adopting the structure illustrated in FIGS. 9 and 10, an insulation member is not required to be arranged between a negative electrode terminal and a positive electrode terminal. In addition, it is possible to reduce in volume further by the amount of the negative electrode terminals 7-1, 7-2 to be layered, so that current capacity per unit volume is increased.

Figure 11:
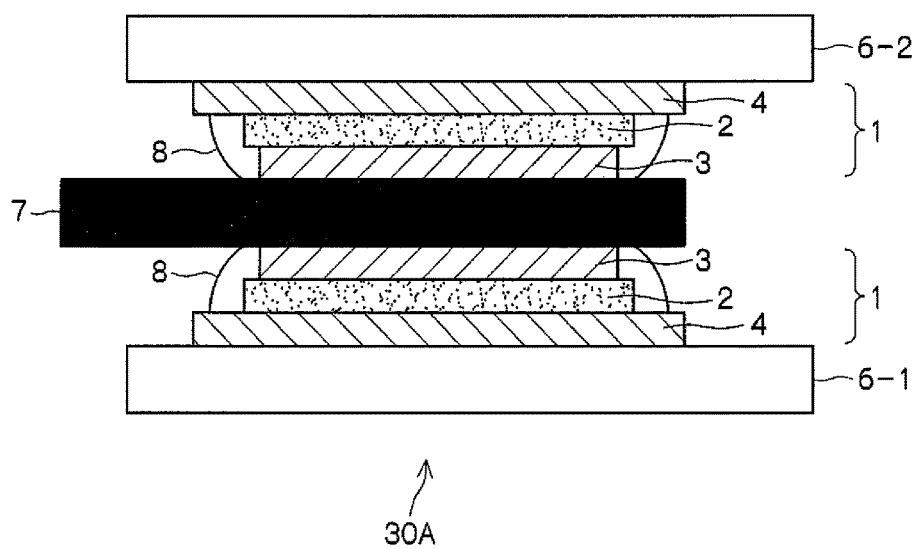
FIG. 11 is a sectional view illustrating a single-layer structure for forming an alternate multilayer structure in parallel connection with first electrode layers mutually faced.

(A-2-3) Alternate Multilayer Structure in Parallel Connection with First Electrode Layers 3 Mutually Faced FIG. 11 is a sectional view illustrating a layered structure in parallel connection with first electrode layers 3 of two secondary cells 1 juxtaposed and connected as being mutually faced.

Figure 12:
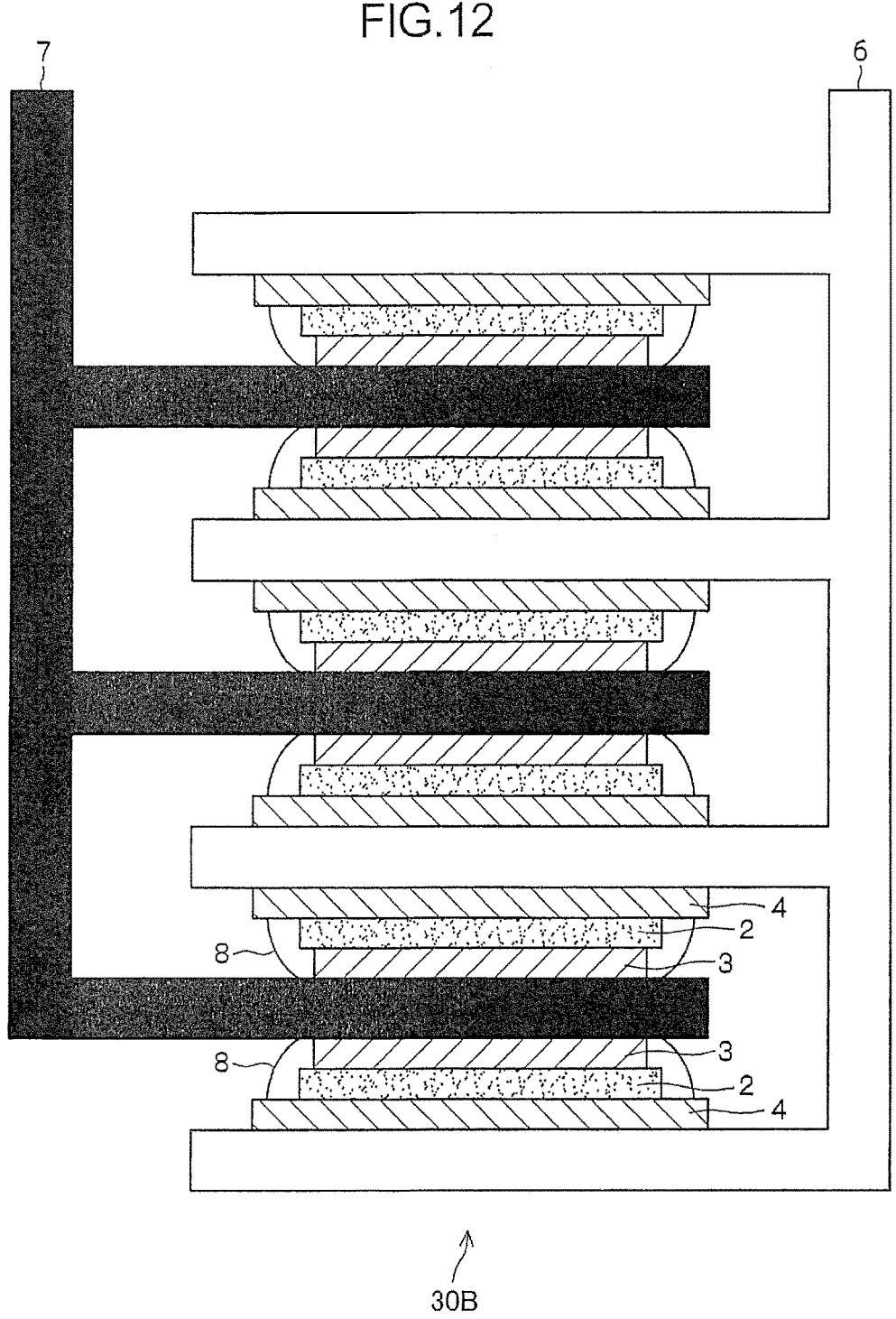
FIG. 12 is a sectional view illustrating a multilayer structure in parallel connection using a plurality of the single-layers in FIG. 11.

FIG. 12 is a sectional view illustrating an alternate multilayer structure in parallel connection using a plurality of single-layers, the single-layer having the structure illustrated in FIG. 11.

In a single-layer 30A illustrated in FIG. 11, one secondary cell 1 is sandwiched between a positive electrode terminal 6-1 and a negative electrode terminal 7 and the other secondary cell 1 is sandwiched between the negative electrode terminal 7 and a positive electrode terminal 6-2.

In the structure of the single-layer 30A, the first electrode layers 3 of the one secondary cell 1 and the other secondary cell 1 are mutually faced and sandwich the negative electrode terminal 7. The first electrode layer 3 of the one secondary cell 1 and the first electrode layer 3 of the other secondary cell 1 are juxtaposed and connected and the second electrode layer 4 of the one secondary cell 1 and the second electrode layer 4 of the other secondary cell 1 are wire-connected to the positive electrode terminals 6-1, 6-2, respectively.

As illustrated in FIG. 11, in the single-layer 30A, the one secondary cell 1 sandwiched by the positive electrode terminal 6-1 and the negative electrode terminal 7 is arranged with the second electrode layer 4, the charging layer 2, and the first electrode layer 3 placed in the order thereof in a direction from the positive electrode terminal 6-1 toward the negative electrode terminal 7. Meanwhile, the other secondary cell 1 sandwiched between the negative electrode terminal 7 and the positive electrode terminal 6-2 is arranged with the first electrode layer 3, the charging layer 2, and the second electrode layer 4 in the order thereof in a direction from the negative electrode terminal 7 toward the positive electrode terminal 6-2.

A multilayer 30B in parallel connection illustrated in FIG. 12 has a structure that three single-layers 30A are layered.

In a case that a single-layer 30A is layered on another single-layer 30A, the positive electrode terminal 6-1 of the single-layer 30A is layered on the positive electrode terminal 6-2 of the other single-layer 30A. Such a structure may be adopted. However, in the present embodiment, as illustrated in FIG. 12, the two positive electrode terminals 6-1, 6-2 between the layered single-layers 30A are formed as a single positive electrode terminal 6 for further reducing the volume thereof.

Here, the secondary cell 1 is assumed to have voltage $V_0$ and current capacity $I_0$. In this case, voltage $V_{30B}$ of the multilayer 30B in FIG. 12 is $V_0$. Then, since the number of layers N is six, current capacity $I_{30B}$ of the multilayer 30B in FIG. 12 becomes to $6I_0$ ($=N \times I_0$). Thus, parallel connection increases the current capacity.

Similarly to the case of adopting the structure illustrated in FIGS. 7 and 8, owing to adopting the structure illustrated in FIGS. 11 and 12, an insulation member is not required to be arranged between a negative electrode terminal and a positive electrode terminal in the parallel connection. Accordingly, volume is reduced by the amount thereof and current capacity per unit volume is increased.

Figure 13:
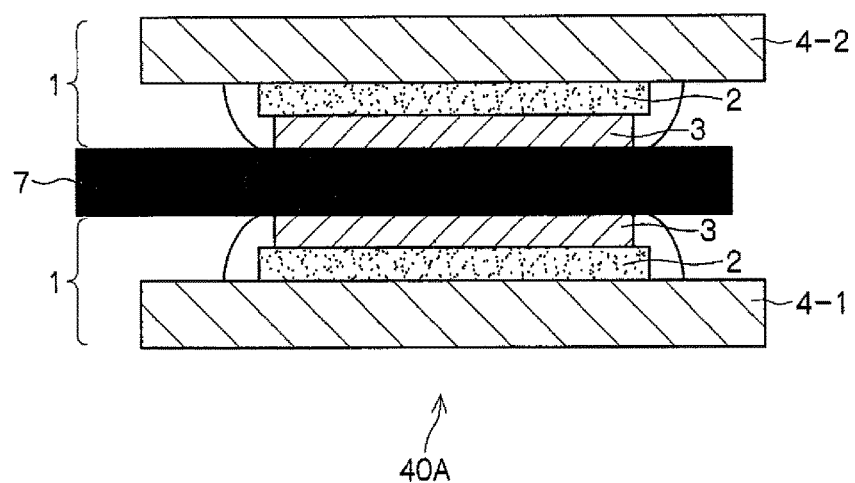
FIG. 13 is a sectional view illustrating a single-layer structure for forming an alternate multilayer structure in parallel connection with first electrode layers mutually faced and a positive electrode terminal also serving as a second electrode layer.

(A-2-4) Alternate Multilayer Structure in Parallel Connection with First Electrode Layers 3 Mutually Faced and Second Electrode Layers 4 Also Serving as Positive Electrode Terminal FIG. 13 is a sectional view illustrating a layered structure in parallel connection with the first electrode layers 3 of two secondary cells 1 juxtaposed and connected as being mutually faced.

Figure 14:
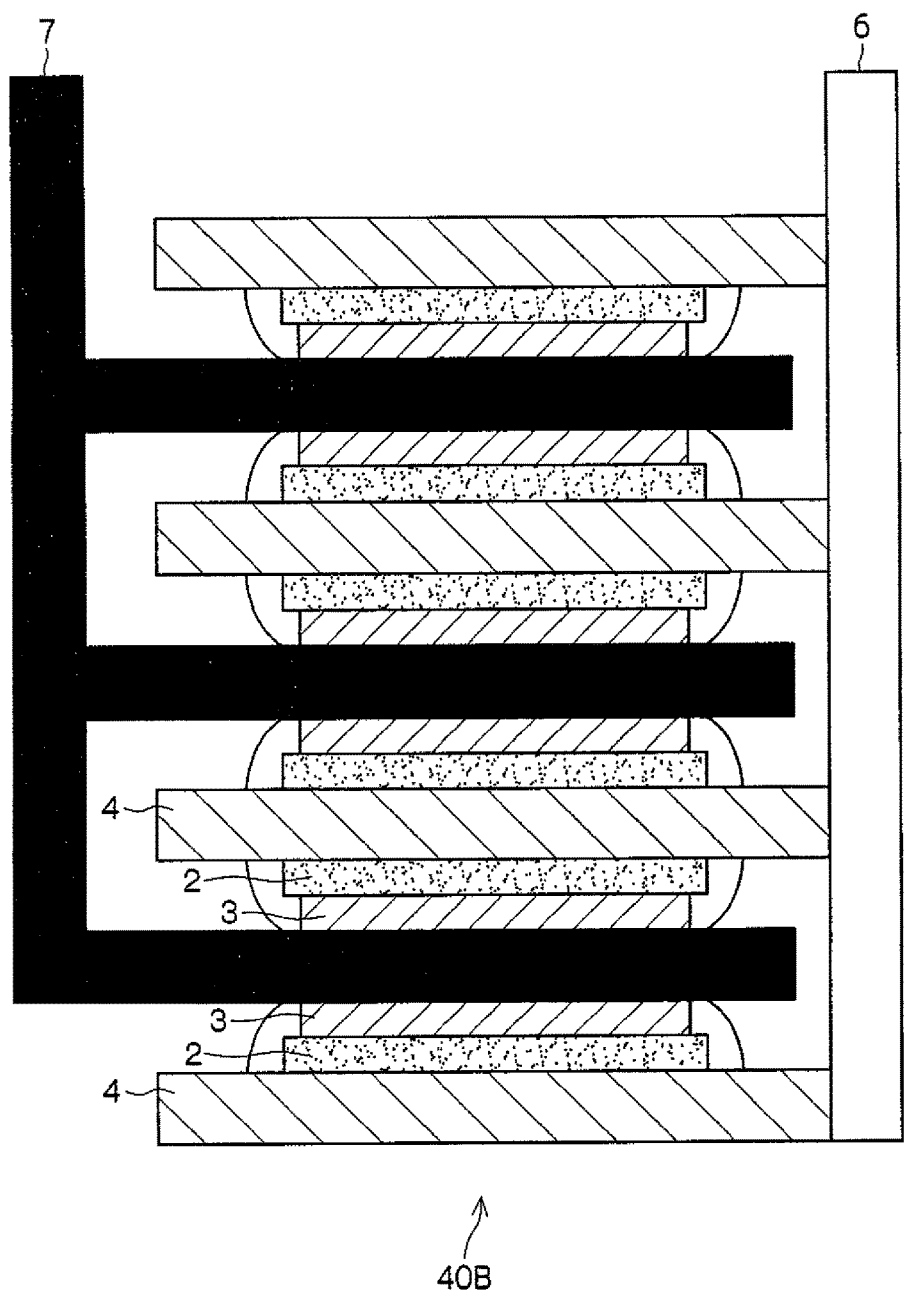
FIG. 14 is a sectional view illustrating a multilayer structure in parallel connection using a plurality of the single-layers in FIG. 13.

FIG. 14 is a sectional view illustrating an alternate multilayer structure in parallel connection using a plurality of single-layers, the single-layer having the structure illustrated in FIG. 13.

In a single-layer 40A illustrated in FIG. 13, the second electrode layers 4 also serve as leading positive electrode terminals 6-1, 6-2 illustrated in FIG. 11. That is, as illustrated in FIG. 13, two secondary cells 1 are arranged to sandwich the negative electrode terminal 7 with the first electrode layers 3 mutually faced. The second electrode layer 4-1 of one secondary cell 1 corresponds to the leading positive electrode terminal 6-1 in FIG. 11 and the second electrode layer 4-2 of the other secondary cell 1 corresponds to the positive electrode terminal 6-2 in FIG. 11.

Accordingly, compared to the single-layer 30A in FIG. 11, the single-layer 40A in FIG. 13 is reduced in volume by the amount of the leading positive electrode terminals 6-1, 6-2.

A multilayer 40B in parallel connection illustrated in FIG. 14 has a structure that three single-layers 40A are layered.

In a case that a single-layer 40A is layered on another single-layer 40A, the second electrode layer 4-1 of the single-layer 40A is layered on the second electrode layer 4-2 of the other single-layer 40A. Such a structure may be adopted. However, in the present embodiment, as illustrated in FIG. 14, the two second electrode layers 4-1, 4-2 between the layered single-layers 40A are formed as a single second electrode layer 4 for further reducing the volume thereof.

In FIG. 14, the second electrode layer 4 corresponds to the leading positive electrode terminal 6. Therefore, in the multilayer 40B in FIG. 14, the second electrode layers 4 are extended in one direction so as to be wire-connected to the positive electrode terminal 6.

Here, the secondary cell 1 is assumed to have voltage $V_0$ and current capacity $I_0$. In this case, voltage $V_{40B}$ of the multilayer 40B in FIG. 14 is $V_0$. Then, since the number of layers N is six, current capacity $I_{40B}$ of the multilayer 40B in FIG. 14 becomes to $6I_0$ ($=N \times I_0$). Thus, parallel connection increases the current capacity.

Owing to adopting the structure illustrated in FIGS. 13 and 14, an insulation member is not required to be arranged between a negative electrode terminal and a positive electrode terminal. In addition, it is possible to reduce in volume further by the amount of the positive electrode terminals 6 to be layered, so that current capacity per unit volume is increased.

Further, a burden of manufacturing the multilayer 40B in parallel connection is reduced owing to adopting the multilayer structure in parallel connection illustrated in FIG. 14. That is, the multilayer 40B in FIG. 14 can be completed simply by preparing the secondary cells 1 while the secondary electrode layers 4 are extended in one direction and connecting the extended second electrode layers 4 to the positive electrode terminal 6 when the single-layers 40A are layered.

(A-2-5) Direct Alternate Multilayer Structure

Figure 15A:
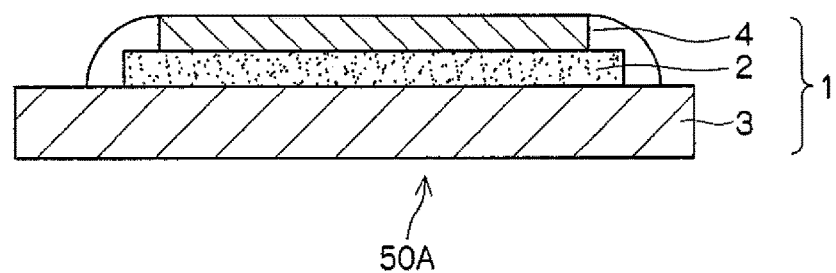
FIG. 15 includes sectional views illustrating single-layer structures for forming a direct alternate multilayer structure.
Figure 15B:
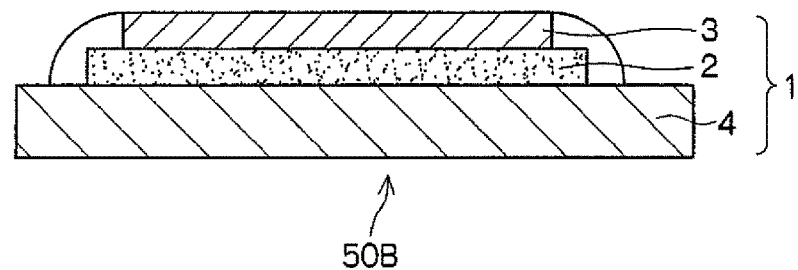

FIG. 15 is a sectional view illustrating single-layer structures for forming a direct alternate multilayer structure. FIG. 15 illustrates two kinds of single-layer structures. FIG. 15(A) illustrates a structure of a single-layer 50A in which the charging layer 2 and the second electrode layer 4 are formed on the extended first electrode layer 3. FIG. 15(B) illustrates a structure of a single-layer 50B in which the charging layer 2 and the first electrode layer 3 are formed on the extended second electrode layer 4.

Here, a multilayer structure in parallel connection is formed by directly and alternately layering the single-layer 50A and the single-layer 50B being the two kinds illustrated in FIGS. 15(A) and 15(B).

Figure 16:
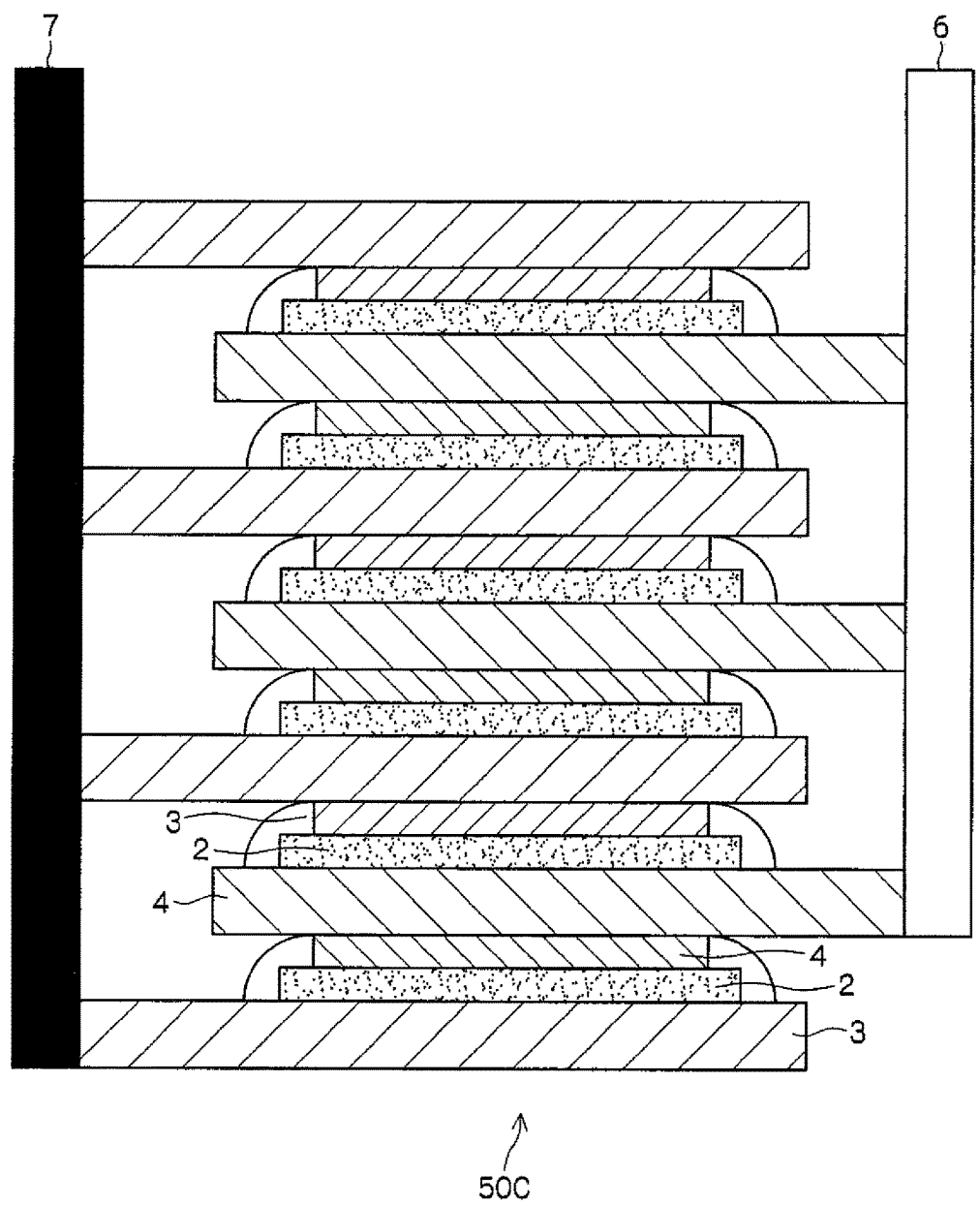
FIG. 16 is a sectional view illustrating a first direct alternate multilayer structure that the single-layers in FIG. 15 are alternately layered.
Figure 17:
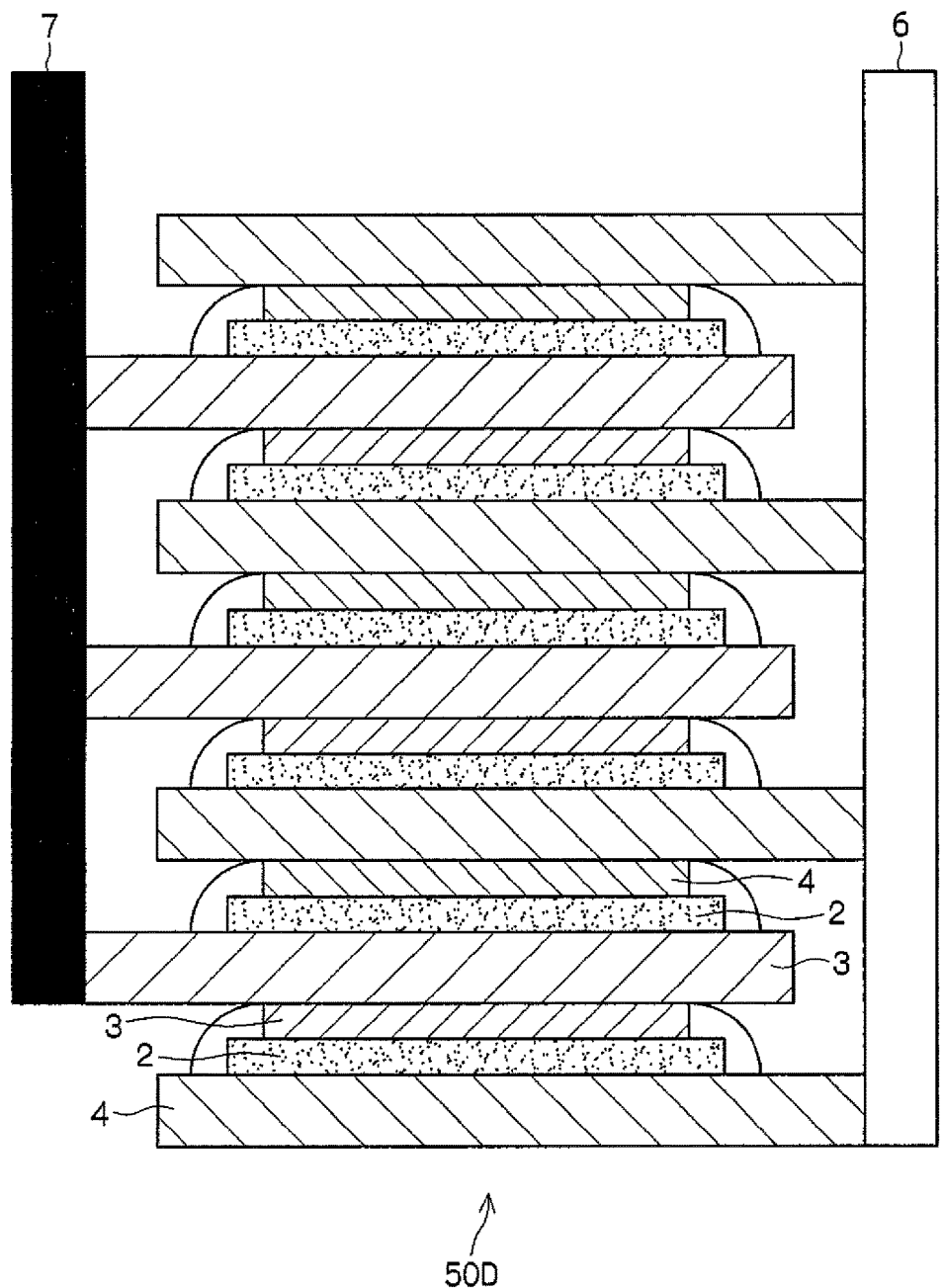
FIG. 17 is a sectional view illustrating a second direct alternate multilayer structure that the single-layers in FIG. 15 are alternately layered.

FIGS. 16 and 17 are sectional views illustrating direct alternate multilayer structures that the two kinds of the single-layers 50A and 50B illustrated in FIG. 15 are alternately layered. Multilayers illustrated in FIGS. 16 and 17 have difference in order of layering the single-layers 50A and the single-layers 50B.

A multilayer 50C illustrated in FIG. 16 has a structure that six single-layers are layered in total in the order, from the lower side, of the single-layer 50A, the single-layer 50B, the single-layer 50A, the single-layer 50B, . . . .

In FIG. 16, since the first electrode layers 3 of the single-layers 50A are extended in one direction, the first electrode layers 3 can be connected to the negative electrode terminal 7. That is, leading negative electrode terminals are not required to be arranged. Similarly, since the second electrode layers 4 of the single-layers 50B are also extended in one direction, the second electrode layers 4 can be connected to the positive electrode terminal 6 and leading positive electrode terminals are not required to be arranged.

A multilayer 50D illustrated in FIG. 17 has a structure that six single-layers are layered in total in the order, from the lower side, of the single-layer 50B, the single-layer 50A, the single-layer 50B, the single-layer 50A, . . . . In this case as well, since the first electrode layers 3 of the single-layer 50A and the second electrode layers 4 of the single-layer 50B are connected respectively to the negative electrode terminal 7 and the positive electrode terminal 6 as being extended respectively in one direction, leading terminals are not required to be arranged. Accordingly, total volume of a battery having the multilayer structure can be reduced.

(A-3) Effects of the First Embodiment and Modified Embodiments

In the abovementioned embodiments, a plurality of secondary cells 1 each having the charging layer 2 between the first electrode layer 3 and the second electrode layer 4 are parallel-connected while the first electrode layers 3 or the second electrode layers 4 of the respective secondary cells 1 are juxtaposed and connected as being mutually faced and the second electrode layers 4 or the first electrode layers 3 are wire-connected. Accordingly, since conventionally-required insulation layers are not required to be arranged, total volume of a battery is reduced by the amount thereof. Thus, current capacity per unit volume is increased.

Further, as a process of manufacturing a secondary battery having the multilayer structure, it is considered to form the multilayer structure by layering secondary cells 1 obtained by cutting a sheet-shaped secondary cell 1 into a predetermined size. Thus, it is possible to form the multilayer structure having the same area. Further, even in a case that a defect part occurs at the sheet-shaped secondary cell 1, it is possible to form the multilayer structure having the same area as avoiding the defect part.

(B) Second Embodiment

Next, a second embodiment of a secondary battery according to the present invention will be described with reference to the drawings.

In the first embodiment, the multilayer structure is obtained by layering the single-layers, the single-layer being the secondary cell 1 whose base material is the negative electrode terminal 7, the positive electrode terminal 6, the first electrode layer 3, or the second electrode layer 4.

In contrast, the second embodiment adopts a multilayer structure in parallel connection having secondary cells 1 attached to the base materials 5 as illustrated in FIG. 1.

(B-1) Alternate Multilayer Structure in Parallel Connection with Secondary Cells 1 Attached to Base Materials 5

Figure 18:
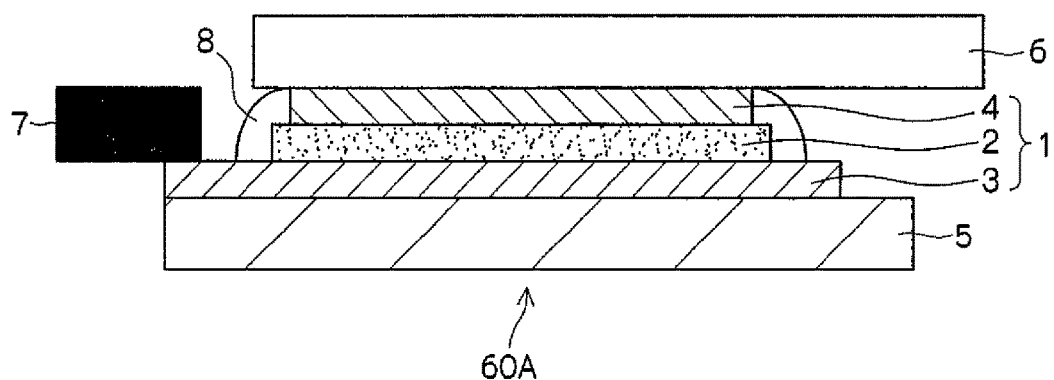
FIG. 18 is a sectional view illustrating a first single-layer structure for an alternate multilayer in parallel connection with a secondary cell attached to a base material.

FIG. 18 is a sectional view illustrating a single-layer structure for an alternate multilayer in parallel connection with a secondary cell 1 attached to a base material 5.

In a structure of a single-layer 60A illustrated in FIG. 18, the secondary cell 1 is attached to the base material (support body) 5 formed of insulation material such as polyimide in the order of the first electrode layer 3, the charging layer 2, and the second electrode layer 4, and the positive electrode terminal 6 is connected to the second electrode layer 4.

Here, since the first electrode layer 3 is attached to the base material 5, the first electrode layer 3 is extended in one direction along with the base material 5 to which the first electrode layer 3 is attached for connecting the negative electrode terminal 7 to the first electrode layer 3. Then, the negative electrode terminal 7 is wire-connected to the extended part from the inside. That is, as illustrated in FIG. 18, the negative electrode terminal 7 is connected to an upper face of the extended first electrode layer 3.

FIG. 18 illustrates an example in which the positive electrode terminal 6 is connected to the entire face of the second electrode layer 4. However, it is also possible that the positive electrode terminal 6 is connected to a part of the second electrode layer 4.

Figure 19:
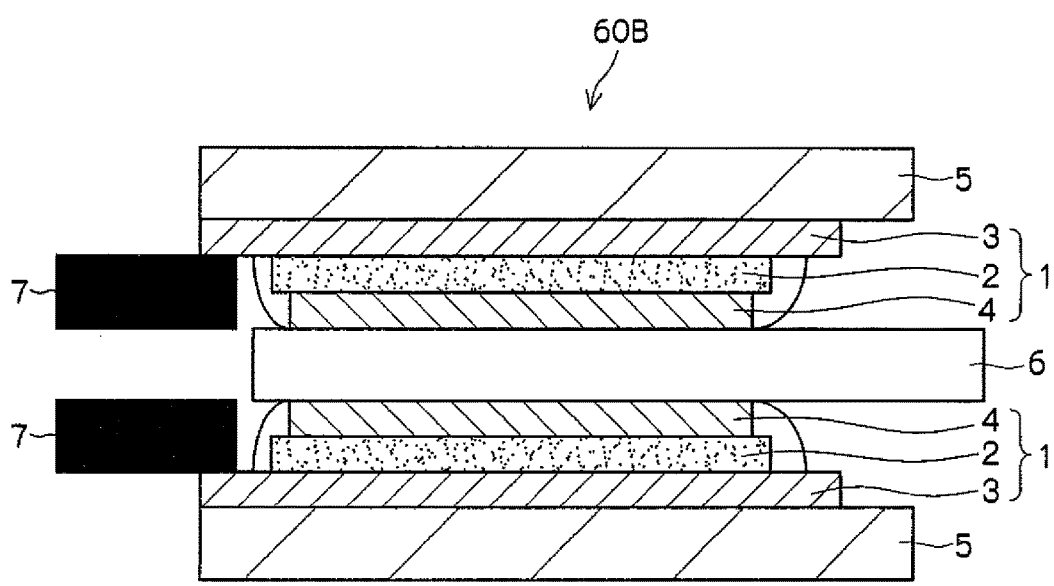
FIG. 19 is a sectional view illustrating a multilayer structure in which two secondary cells each attached to the base material in FIG. 18 are parallel-connected.

FIG. 19 is a sectional view illustrating a multilayer structure in which two secondary cells 1 attached to the base materials 5 are parallel-connected.

In a structure of a multilayer 60B in FIG. 19, the second electrode layers 4 of the respective secondary cells 1 attached to the base materials 5 are mutually faced and sandwich the positive electrode terminal 6. The positive electrode terminal 6 is connected to the respective second electrode layers 4 so that electrons can be transferred. Further, as described above, the negative electrode terminal 7 is connected to the extended first electrode layer 3 so that electrons can be transferred.

Figure 20:
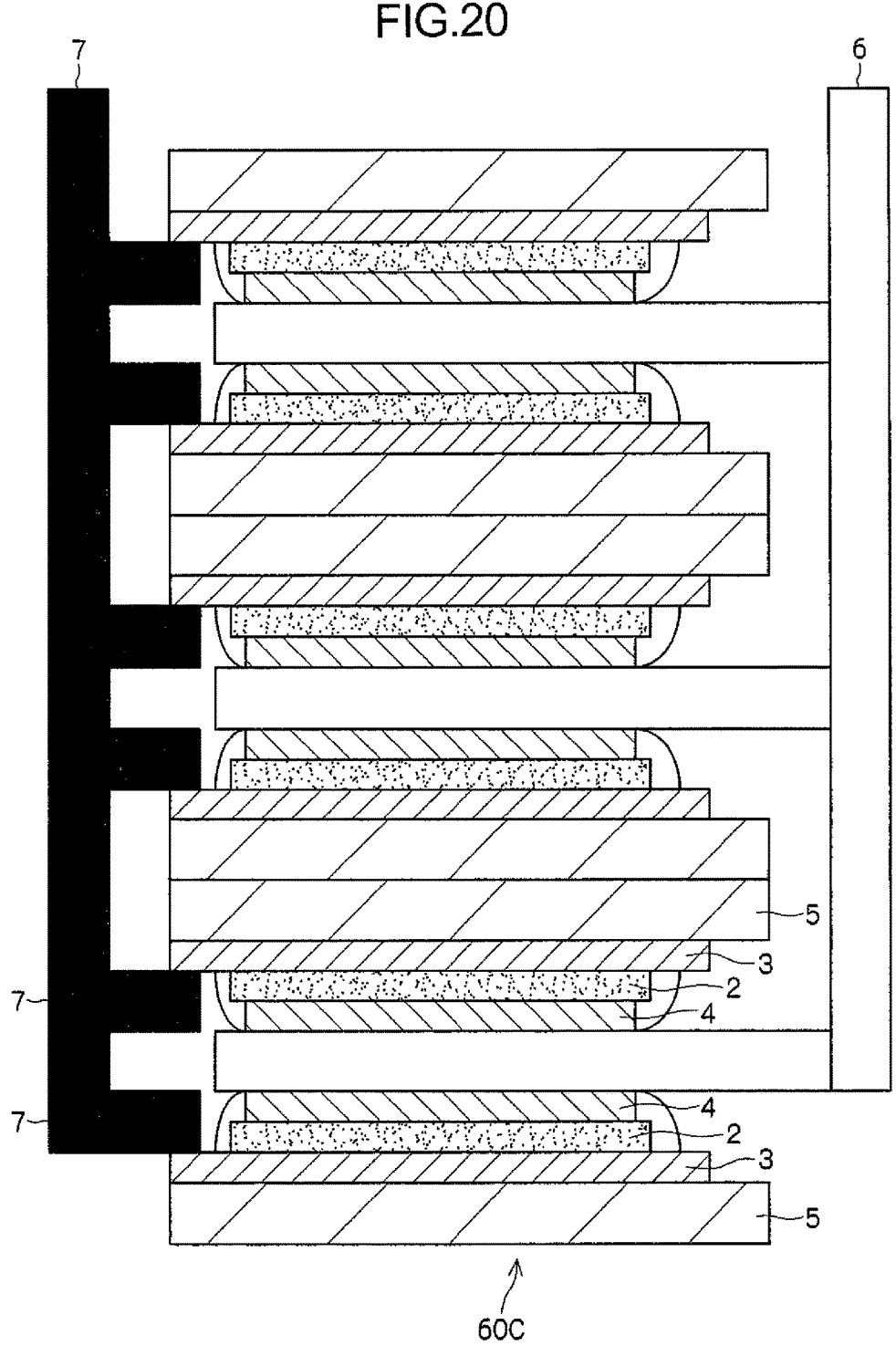
FIG. 20 is a sectional view illustrating a multilayer structure in parallel connection using a plurality of single-layers in FIG. 19.

FIG. 20 is a sectional view illustrating a multilayer structure in parallel connection using a plurality of single-layers 60B illustrated in FIG. 19. A multilayer 60C in parallel connection illustrated in FIG. 20 has a structure in which three single-layers 60B are layered.

Figure 21:
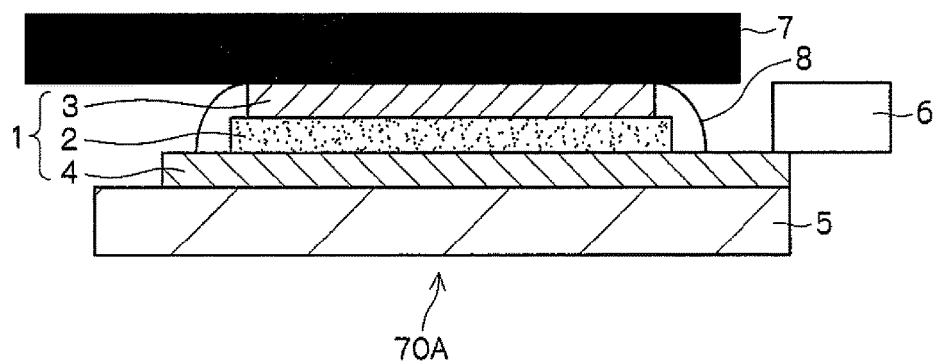
FIG. 21 is a sectional view illustrating a second single-layer structure for an alternate multilayer in parallel connection with a secondary cell attached to a base material.

(B-2) Alternate Multilayer Structure in Parallel Connection with Secondary Cells Attached to Base Materials FIG. 21 is a sectional view illustrating a single-layer structure for an alternate multilayer in parallel connection with a secondary cell attached to a base material. In a structure of a single-layer 70A illustrated in FIG. 21, the secondary cell 1 is attached to the base material (support body) 5 formed of insulation material such as polyamide in the order of the second electrode layer 4, the charging layer 2, and the first electrode layer 3, and the negative electrode terminal 7 is connected to the first electrode layer 3.

Here, since the second electrode layer 4 is attached to the base material 5, the second electrode layer 4 is extended in one direction along with the base material to which the second electrode layer 4 is attached for connecting the positive electrode terminal 6 to the second electrode layer 4. Then, the positive electrode terminal 6 is wire-connected to the extended part from the inside. That is, as illustrated in FIG. 21, the positive electrode terminal 6 is connected to an upper face of the extended second electrode layer 4.

FIG. 21 illustrates an example in which the negative electrode terminal 7 is connected to the entire face of the first electrode layer 3. However, it is also possible that the negative electrode terminal 7 is connected to apart of the first electrode layer 3.

Figure 22:
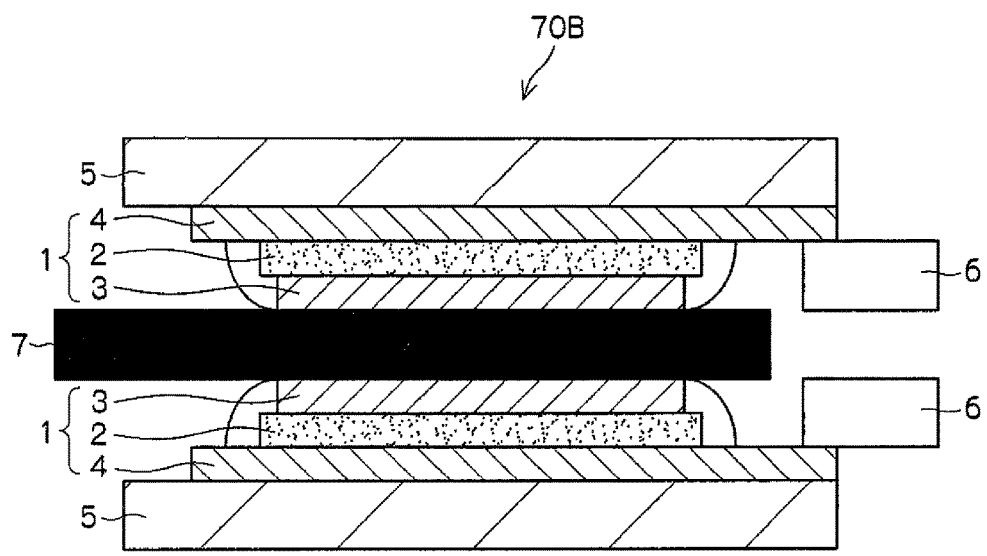
FIG. 22 is a sectional view illustrating a multilayer structure in which two secondary cells each attached to the base material in FIG. 21 are parallel-connected.

FIG. 22 is a sectional view illustrating a multilayer structure in which two secondary cells 1 attached to the base materials 5 are parallel-connected.

In a structure of a multilayer 70B in FIG. 22, the first electrode layers 3 of the two secondary cells 1 are mutually faced and sandwich the negative electrode terminal 7. The negative electrode terminal 7 is connected to the respective first electrode layers 3 so that electrons can be transferred. Further, as described above, the positive electrode terminal 6 is connected to the extended second electrode layer 4 so that electrons can be transferred.

Figure 23:
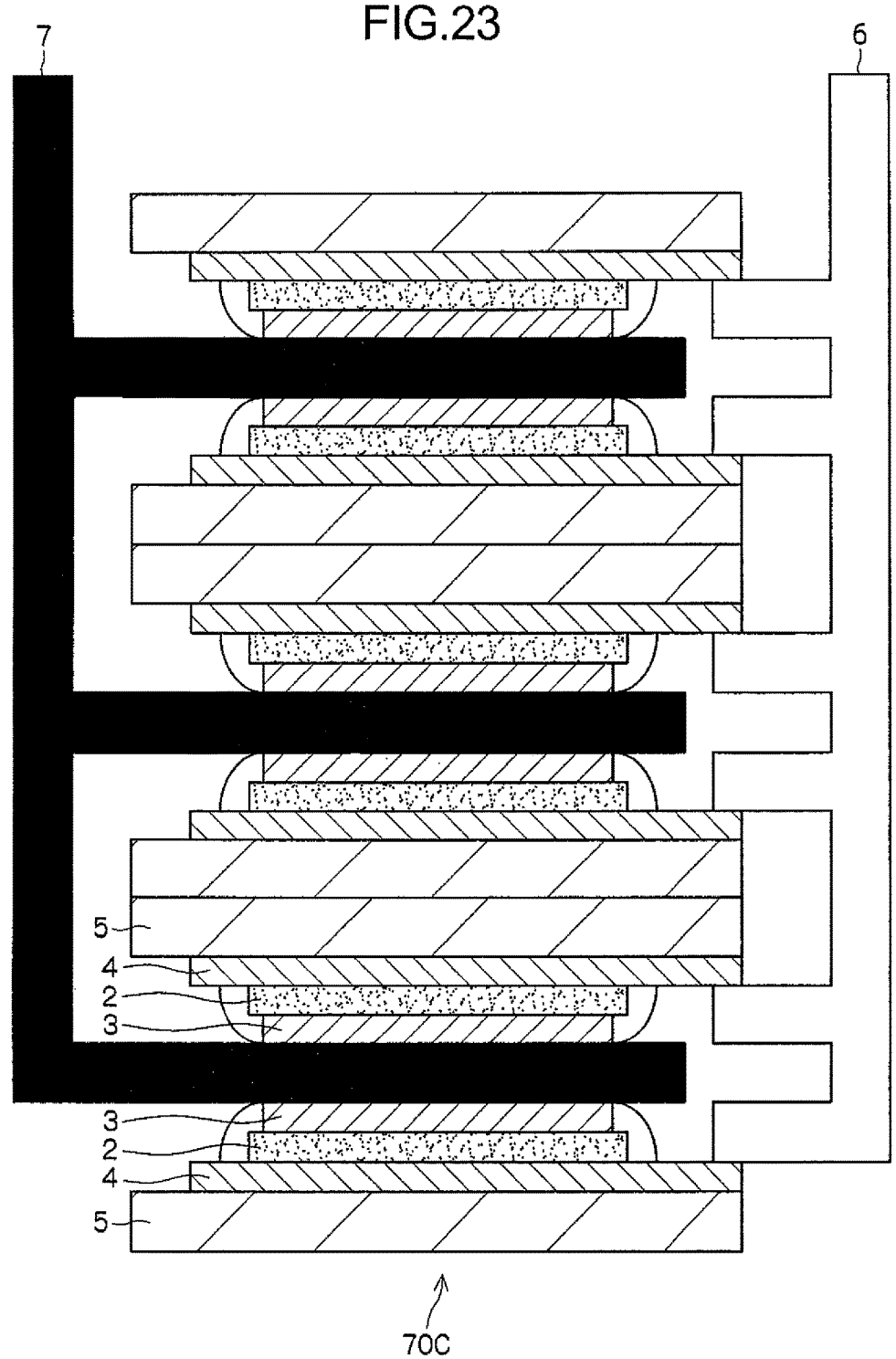
FIG. 23 is a sectional view illustrating a multilayer structure in parallel connection using a plurality of single-layers in FIG. 22.

FIG. 23 is a sectional view illustrating a multilayer structure in parallel connection using a plurality of single-layers 70B illustrated in FIG. 22. A multilayer 70C in parallel connection illustrated in FIG. 23 has a structure in which three single-layers 70B are layered.

(C) Third Embodiment

Next, a third embodiment of a secondary battery according to the present invention will be described with reference to the drawings.

The third embodiment adopts a multilayer structure obtained by combining a multilayer structure in serial connection and a multilayer structure in parallel connection.

(C-1) Combination Structure of Serial Connection and Parallel Connection

Figure 24:
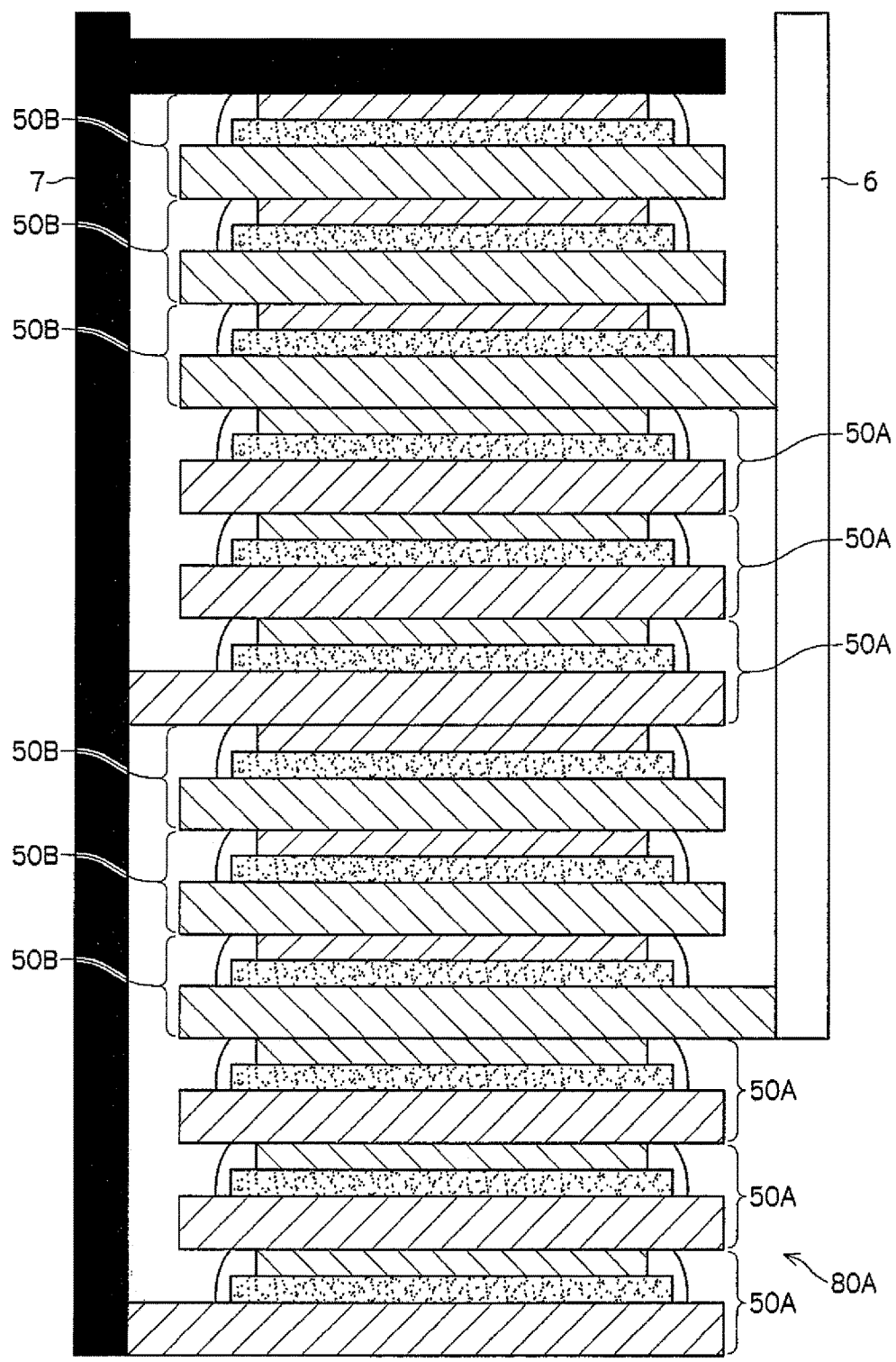
FIG. 24 is a sectional view illustrating a multilayer structure in which a multilayer structure in serial connection and a multilayer structure in parallel connection are combined.

FIG. 24 is a sectional view illustrating a multilayer structure in which a multilayer structure in serial connection and a multilayer structure in parallel connection are combined using the two type of the single-layers 50A, 50B exemplified in FIG. 15.

FIG. 24 illustrates an example of a multilayer structure in which three serial connections and two parallel connections are combined. That is, in FIG. 24, a multilayer of three layers in serial connection using the single-layers 50B illustrated in FIG. 15(B) is parallel-connected to a multilayer of three layers in serial connection using the single-layers 50A illustrated in FIG. 15(A). Two parallel connections described above are formed.

Here, the multilayer structure in serial connection using the single-layers 50A in FIG. 15(A) is denoted as a first cell group as well. The multilayer structure in serial connection using the single-layers 50B in FIG. 15(B) is denoted as a second cell group as well.

Here, it is assumed, in a case of a multilayer 80A in FIG. 24, that the secondary cell 1 has voltage $V_0$ and single-layer current capacity $I_0$. In this case, voltage $V_{80A}$ of the multilayer 80A becomes to $3V_0$ and current capacity $I_{80A}$ of the multilayer 80A becomes to $2I_0$. Thus, the voltage value can be increased by adopting a multilayer in serial connection and the current capacity can be increased as well by further adopting a multilayer in parallel connection.

Further, in the multilayer 80A in FIG. 24, as leading electrodes to the first electrode layer 3 and the second electrode layers 4, the first electrode layers 3 and the second electrode layers 4 are extended and connected respectively to the negative electrode terminal 7 and the positive electrode terminal 6. Thus, the negative electrode terminal 7 and the positive electrode terminal 6 are connected respectively to the first electrode layer 3 and the second electrode layer 4, so that electrons can be transferred.

Here, the multilayer 80A illustrated in FIG. 24 is an example of a structure combining serial connection and parallel connection. Although the number of serial-connected layers of each of the single-layer 50A and the single-layer 50B is three in FIG. 24, the number is not limited thereto. Further, although the number of parallel-connected layers is two, the number is not limited thereto.

Further, it is also possible that the single-layers 50A and 50B are layered in the opposite order. For example, FIG. 24 illustrates a case that the multilayer with the single-layers 50B serial-connected is placed on the multilayer with the single-layers 50A serial-connected. However, in reverse, it is also possible that the serial-connected single-layers 50A are placed on the multilayer with the single-layers 50B serial-connected.

(D) Fourth Embodiment

Figure 25:
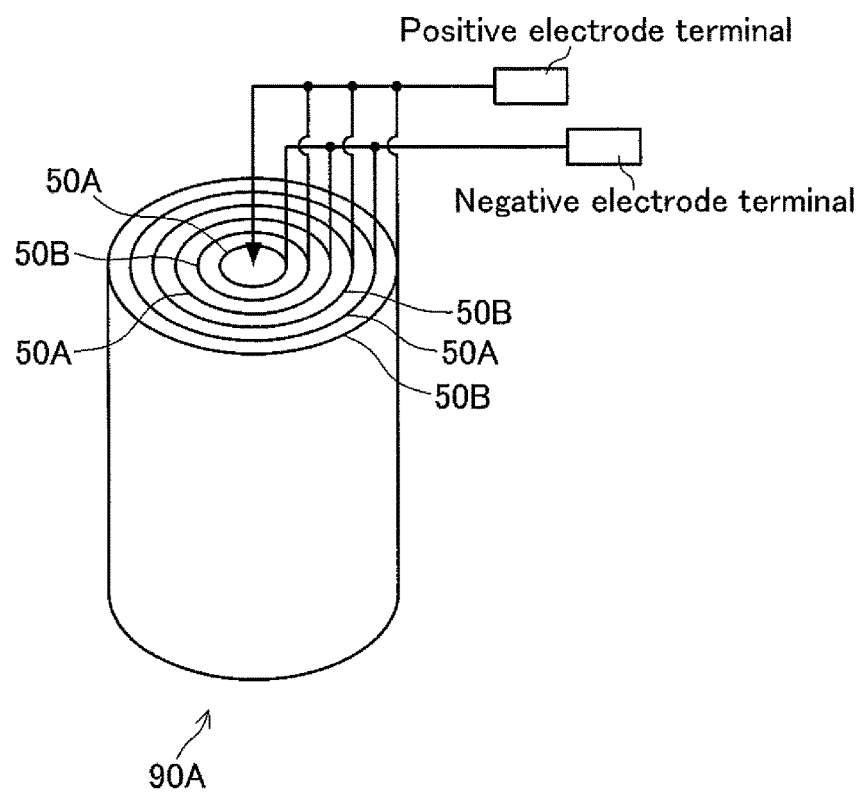
FIG. 25 is a view illustrating a multilayer structure formed by winding the single-layers 50A, 50B illustrated in FIG. 15 alternately in a concentric manner.

FIG. 25 illustrates a multilayer structure obtained by forming the single-layers 50A and the single-layers 50B illustrated in FIG. 15 into ring shapes and arranging the single-layers 50A and the single-layers 50B alternately in a concentric manner.

A multilayer 90 illustrated in FIG. 25 is formed by alternately winding the single-layers 50A and the single-layers 50B such that a single-layer 50A is wound into a ring shape at the innermost side, a single-layer 50B is wound into a ring shape at the outer side thereof, and a single-layer 50A is wound into a ring shape at the outer side of the single-layer 50B.

The single-layer 50A at the innermost side is wound with the second electrode layer 4 located inside. The single-layer 50A at the innermost side may be wound to a rod-shaped positive electrode terminal. Alternatively, the winding may be performed in a state without a rod-shaped positive electrode terminal as long as the second electrode layer 4 of the single-layer 50A can be wire-connected to a positive electrode terminal.

Here, it is also possible that the single-layer at the innermost side is the single-layer 50B and wound with the first electrode layer 3 located inside. In this case, the single-layer 50B may be wound to a rod-shaped negative electrode terminal so that the first electrode layer 3 at the inside can be wire-connected thereto. Alternatively, the wire-connection may be performed without arranging a rod-shaped negative electrode terminal.

A single-layer 50B to be wound outside the single-layer 50A at the innermost side is wound outside the single-layer 50A at the inside so that the first electrode layer 3 thereof is faced to the first electrode layer 3 of the single-layer 50A at the inside. Further, the first electrode layers 3 of the single-layer 50B and the single-layer 50A at the inside are connected to a negative electrode terminal via a lead.

Similarly, a single-layer 50A to be wound outside the single-layer 50B is wound so that the second electrode layer 4 thereof is faced to the second electrode layer 4 of the single-layer 50B at the inside. Further, the second electrode layers 4 of the single-layer 50A and the single-layer 50B at the inside are connected to the positive electrode terminal via a lead.

In a case that ring-shaped single-layers 50A and single-layers 50B are to be wound outside, similarly to the above, parallel connection is formed in a state that a first electrode layer 3 or a second electrode layer 4 of a single-layer 50A or a single-layer 50B at the inside and a first electrode layer 3 or a second electrode layer 4 of a single-layer 50B or a single-layer 50A at the outside are mutually faced.

Here, the multilayer 90A illustrated in FIG. 25 is an example of concentric layering in a section of the multilayer structure. However, a section of the multilayer structure may be ellipsoidal or flattened.

(E) Fifth Embodiment

Next, a fifth embodiment of a secondary battery according to the present invention will be described in detail with reference to the drawings.

In the first to fourth embodiments, description is provided on an example of a multilayer structure in which secondary cells being the cell units are layered in parallel connection. Here, in the fifth embodiment, layered cell units are characterized in shape while increasing current capacity per unit volume as in the first to fourth embodiments. Owing to layering cell units having a characterized shape as in the first to fourth embodiment, it is possible to actualize a multilayer structure which ensures a leading portion to extract electrons from an electrode layer while increasing current capacity per unit volume.

Figure 26:
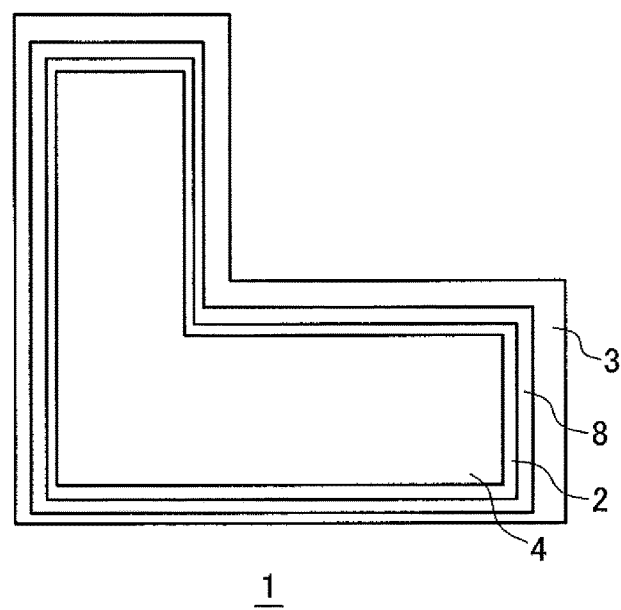
FIG. 26 is an explanatory view illustrating a secondary cell according to a fifth embodiment.

FIG. 26 is an explanatory view illustrating a secondary cell 1 according to the fifth embodiment. FIG. 26 is a view viewing from the above the secondary cell 1 having the structure illustrated in FIG. 1. The secondary cell 1 in the fifth embodiment is L-shaped.

Figure 27:
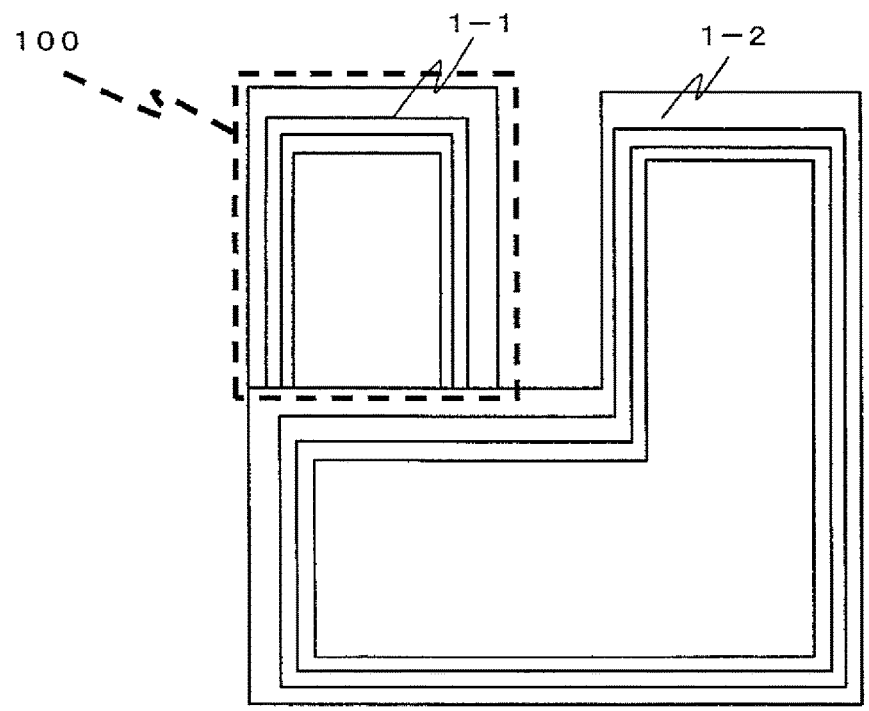
FIG. 27 is an explanatory view illustrating a structure that the secondary cells in FIG. 26 are serial-connected.
Figure 28:
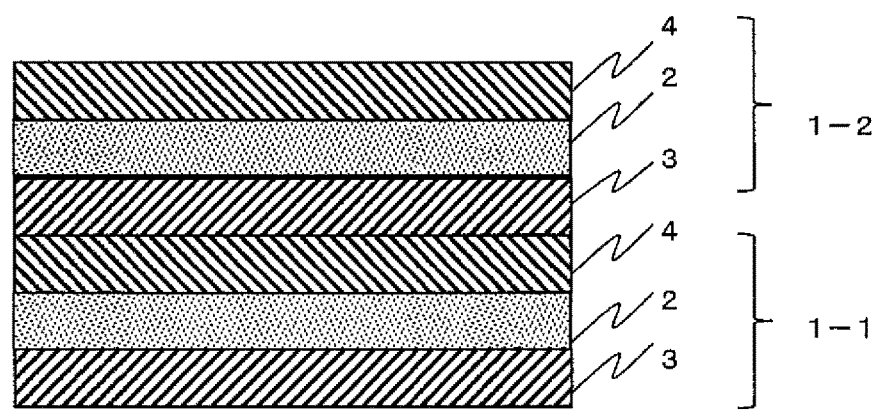
FIG. 28 is a sectional view of a multilayer structure of the serial-connected secondary cells in the fifth embodiment.

FIG. 27 is an explanatory view illustrating a structure that the secondary cells in FIG. 26 are serial-connected. FIG. 28 is a sectional view of a multilayer structure of the serial-connected secondary cells.

For ease of explanation, FIG. 27 illustrates a case that two secondary cells 1-1, 1-2 are serial-connected. However, the number of layers is not specifically limited. In the case of the example of FIG. 27, as illustrated in FIG. 28, each of the secondary cells 1-1, 1-2 is formed in the order of the first electrode layer 3, the charging layer 2, and the second electrode layer 4 from the lower side.

As illustrated in FIG. 27, for example, the sheet-shaped secondary cell 1-2 is rotated counterclockwise by 90 degrees on the same plane and layered on the secondary cell 1-1. According to the above, a non-overlapped portion is exposed in the relationship between the secondary cell 1-1 at the lower side of the multilayer and the secondary cell 1-2 at the upper side of the multilayer. It is possible that the non-overlapped portion serves as a leading portion 100 to extract electrons from the first electrode layer 3 or the second electrode layer 4.

Figure 29:
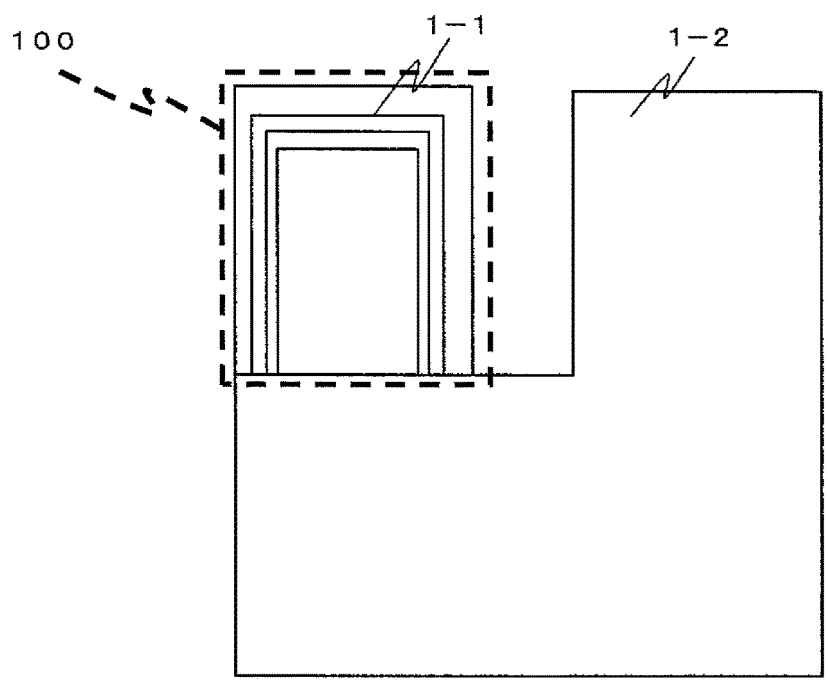
FIG. 29 is an explanatory view illustrating a structure that the secondary cells in FIG. 26 are parallel-connected.
Figure 30:
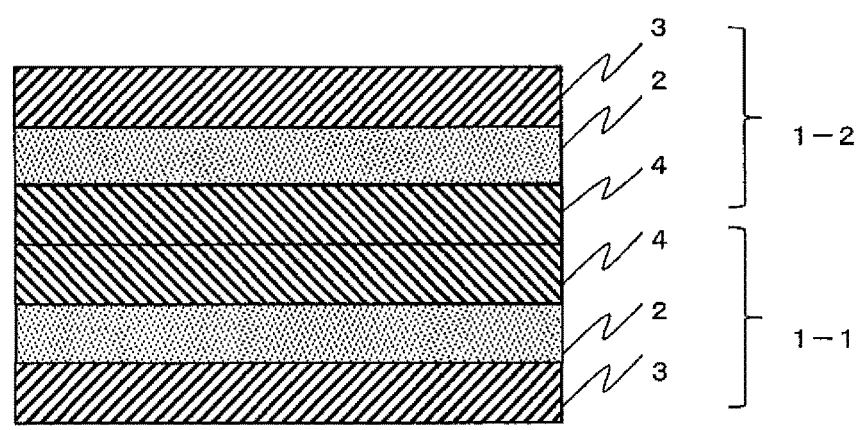
FIG. 30 is a sectional view of a multilayer structure of the parallel-connected secondary cells in the fifth embodiment.

FIG. 29 is an explanatory view illustrating a structure that the secondary cells in FIG. 26 are parallel-connected. FIG. 29 illustrates a case that two secondary cells 1-1, 1-2 are parallel-connected. However, the number of layers is not specifically limited as well. FIG. 30 is a sectional view of a multilayer structure of the parallel-connected secondary cells.

As illustrated in FIG. 29, in the case that the two secondary cells 1-1, 1-2 are parallel-connected, the secondary cell 1-1 is formed in the order of the first electrode layer 3, the charging layer 2, and the second electrode layer 4 from the lower side while the secondary cell 1-2 is formed in the order of the secondary electrode layer 4, the charging layer 2, and the first electrode layer 3 from the lower side, as illustrated in FIG. 30.

In the case that the secondary cells 1-1, 1-2 are parallel-connected as well, as illustrated in FIG. 29, for example, the secondary cell 1-2 is layered on the secondary cell 1-1 after being rotated counterclockwise by 90 degrees on the same plane, a non-overlapped portion is exposed in the relation between the secondary cell 1-1 at the lower side of the multilayer and the secondary cell 1-2 at the upper side of the multilayer. It is possible that the non-overlapped portion serves as a leading portion 100 to extract electrons from the first electrode layer 3 or the second electrode layer 4.

In both cases of the serial connection in FIG. 27 and the parallel connection in FIG. 29, the leading portion 100 being the non-overlapped portion exists at the inside of the external form of the entire secondary battery having the multilayer structure. That is, owing to that the L-shaped secondary cells 1 illustrated in FIG. 26 are layered on a sheet plane after each being rotated by 90 degrees, the leading portion 100 to extract electrons from the first electrode layer 3 or the second electrode layer 4 is formed at the inside of the external form of the multilayer structure. The structures described in the first to fourth embodiments can be adopted as the multilayer structure of the secondary battery. Accordingly, while increasing current capacity of the entire secondary battery having the multilayer structure similarly to the first to fourth embodiments, the leading portion 100 to extract electrons from the first electrode layer 3 or the second electrode layer 4 can be ensured. Further, as exemplified in FIG. 24, it is possible to adopt a multilayer structure combining a multilayer structure in serial connection and a multilayer structure in parallel connection.

Further, in a case of a multilayer structure with a plurality of secondary cells 1 serial-connected and/or a multilayer structure with a plurality of secondary cells 1 parallel-connected, voltage and current capacity can be arbitrarily adjusted. When the secondary cells 1 shaped as illustrated in FIG. 26 are layered, electrons can be extracted from the leading portion 100 of each of the layered secondary cells 1. Accordingly, voltage and current capacity can be adjusted.

In the fifth embodiment, description is provided on an example that the secondary cell 1 is L-shaped as illustrated in FIG. 26. However, the shape of the secondary cell 1 is not limited to an L-shape. That is, the shape is simply required to be capable of forming a non-overlapped portion at the inside of an external form of a multilayer structure between a secondary cell 1 at the upper side of the multilayer and a secondary cell 1 at the lower side of the multilayer when a plurality of the secondary cells 1 are layered. For example, the secondary cell may be formed into a triangle such as a right triangle, a T-shape, a U-shape, or the like.

(F) Other Embodiments (F-1) The number of layers of the secondary battery having the multilayer structure described in the first to fifth embodiments is not specifically limited. As described above, current capacity $I_1$ ($=N \times I_0$) of a secondary battery having a multilayer structure becomes large with increase of the number of layers. However, volume of the secondary battery having the multilayer structure becomes large as well by the amount thereof. Accordingly, the number of layers may be appropriately determined in accordance with intended use, a use mode, and the like of the secondary battery.

(F-2) For the sake of explanatory convenience, the description of each of the first to fifth embodiments is provided using sectional views of a single-layer structure and a multilayer structure. However, the single-layer structures and the multilayer structures described in the first to fifth embodiments are simply examples. The structure is not limited to that illustrated in each drawing.

For example, in the description of the first to fifth embodiments, the negative electrode terminal and the positive electrode terminal exist at both ends of the multilayer structure. However, the negative electrode terminal and the positive electrode terminal are not required to exist at both ends of the multilayer structure. That is, the negative electrode terminal and the positive electrode terminal are simply required to exist at positions to be capable of transferring electrons to and from a first electrode layer and a second electrode layer of each secondary cell. For example, although the negative electrode terminal and the positive electrode terminal are arranged at the right and left sides in FIG. 8, it is also possible that the negative electrode terminal and the positive electrode terminal are arranged at the near side and the far side in the normal direction of the depiction of the drawing. Alternatively, it is also possible that the negative electrode terminal is arranged at the left side and the positive electrode terminal is arranged at the near side in the normal direction of the depiction of the drawing. Further, the negative electrode terminal and the positive electrode terminal may be plate-shaped or rod-shaped. Further, not limited to a single member, a plurality of members therefor may be aligned in the normal direction of the depiction of the drawing. Further, in each of the abovementioned embodiments, a plurality of single-layer cells are arranged (layered) in the vertical direction. However, it is also possible that a plurality of single-layer cells are arranged in the lateral direction.

(F-3) In the first to fifth embodiments, leading electrodes for transferring electrons from and to a first electrode layer and/or a second electrode layer are connected to the entire face of the first electrode layer and/or the second electrode layer. However, it is also possible to be connected to a part of the first electrode layer and/or the second electrode layer.

(F-4) Processes of forming a single-layer are not specifically limited. A variety of methods may be adopted therefor.

(F-5) In the first to fifth embodiments, solid-state secondary cells are assumed as secondary cells. The charging layer between the first electrode layer and the second electrode layer may be formed of organic solid material or inorganic solid material.

(F-6) In the description of the first to third embodiments, secondary cells are formed flat. However, the secondary cells are not limited to be formed flat. For example, it is also possible to form the multilayer described in each of the first to third embodiments using secondary cells each having a curved section as an arc.

The invention claimed is:

1. A secondary battery, comprising two cell units,
wherein each said cell unit includes a charging layer between a positive electrode layer and a negative electrode layer to store electrons during a charging operation and release the stored electrons during a discharging operation, the charging layer being formed by photoexcited structural change to generate at least one electron free energy level in a band gap of the charging layer, the energy level capturing electrons during charging and releasing them during discharging,
wherein the two cell units are parallel-connected by:
  (a1) juxtaposing and connecting negative electrode layers of the two cell units by disposing the negative electrode layers on opposites sides of and adjacent to a first negative electrode terminal, and
  (a2) connecting the positive electrode layers of the two cell units, which are separated from each other by the negative electrode layers and are not juxtaposed, by extending the positive electrode layers in one direction beyond edges of the charging layers to form positive leading portions of a first positive electrode terminal that connects the positive electrode layers; or
  (b1) juxtaposing and connecting the positive electrode layers of the two cell units by disposing the positive electrode layers on opposites sides of and adjacent to a second positive electrode terminal that extends between the positive electrode layers, and
  (b2) connecting the negative electrode layers of the two cell units, which are separated from each other by the negative electrode layers and are not juxtaposed, by extending the negative electrode layers in one direction beyond edges of the charging layers to form negative leading portions of a second negative electrode terminal that connects the negative electrode layers.

2. The secondary battery according to claim 1,
wherein the one cell unit is arranged between the first positive electrode terminal and the second negative electrode terminal, and
the other cell unit is arranged between the second negative electrode terminal connected to the one cell unit and another first positive electrode terminal.

3. A secondary battery, comprising a plurality of structural unit cells which are parallel-connected, each structural unit cell being the secondary battery according to claim 2 as one structural unit,
wherein the first positive electrode terminal of a structural unit cell and the first positive electrode terminal of another structural unit cell located adjacent to the structural unit cell are replaced with a single first positive electrode terminal.

4. The secondary battery according to claim 1,
wherein the one cell unit is arranged between the second negative electrode terminal and the first positive electrode terminal, and
the other cell unit is arranged between the first positive electrode terminal connected to the one cell unit and another second negative electrode terminal.

5. A secondary battery, comprising a plurality of structural unit cells which are parallel-connected, each structural unit cell being the secondary battery according to claim 1 as one structural unit.

* * * * *